(12) United States Patent
Haga

(10) Patent No.: US 8,928,620 B2
(45) Date of Patent: Jan. 6, 2015

(54) FLAT-PANEL DISPLAY DEVICE AND ELECTRONIC APPARATUS

(75) Inventor: Hiroshi Haga, Kanagawa (JP)

(73) Assignee: NLT Technologies, Ltd., Kanagawa (JP)

(*) Notice: Subject to any disclaimer, the term of this patent is extended or adjusted under 35 U.S.C. 154(b) by 874 days.

(21) Appl. No.: 12/185,489

(22) Filed: Aug. 4, 2008

(65) Prior Publication Data

US 2009/0040192 A1 Feb. 12, 2009

(30) Foreign Application Priority Data

Aug. 7, 2007 (JP) ................................. 2007-205442

(51) Int. Cl.
*G06F 3/045* (2006.01)
*G06F 3/044* (2006.01)

(52) U.S. Cl.
CPC ..................................... *G06F 3/044* (2013.01)
USPC ........................................................ 345/174

(58) Field of Classification Search
CPC ............. G09G 5/00; G09G 3/36; G06F 3/041
See application file for complete search history.

(56) References Cited

U.S. PATENT DOCUMENTS

| | | | |
|---|---|---|---|
| 4,293,734 A | 10/1981 | Pepper, Jr. | |
| 5,642,134 A | 6/1997 | Ikeda | |
| 5,854,881 A * | 12/1998 | Yoshida et al. ............... | 345/104 |
| 6,259,490 B1 | 7/2001 | Colgan et al. | |
| 2004/0217945 A1* | 11/2004 | Miyamoto et al. ............ | 345/173 |
| 2006/0214918 A1* | 9/2006 | Destura et al. ................ | 345/173 |

FOREIGN PATENT DOCUMENTS

| | | |
|---|---|---|
| JP | 56500230 A | 2/1981 |
| JP | 6317783 A | 11/1994 |
| JP | 8-146381 A | 6/1996 |
| JP | 11-249798 A | 9/1999 |
| JP | 3121592 B2 | 10/2000 |
| JP | 2003-66417 A | 3/2003 |
| JP | 2003-99192 A | 4/2003 |
| JP | 2006-174506 A | 6/2006 |
| WO | WO/80/01762 A1 | 9/1980 |
| WO | WO 2006/054585 A1 | 5/2006 |

OTHER PUBLICATIONS

Communication, dated Nov. 1, 2011, issued by the Japanese Patent Office in corresponding Japanese Application No. 2007-205442.
Communication issued by the Japanese Patent Office, dated Jul. 17, 2012 in counterpart Japanese Patent Application No. 2007205442.
Examiner's Inquiry issued Apr. 2, 2013 in Japanese patent application 2007-205442.
Shoichi Matsumoto, "Liquid Crystal Display Technique," ISBN 4-7828-5543-5, Sangyo Tosho K.K., Nov. 8, 1996.
Office Action, dated May 28, 2013, issued by the Japanese Office Action in counterpart Japanese Application No. 2012-205805.

* cited by examiner

*Primary Examiner* — Tony N Ngo
(74) *Attorney, Agent, or Firm* — Sughrue Mion, PLLC

(57) ABSTRACT

A combination flat-panel touch sensor/display device includes a display device substrate on which signal lines, scanning lines and storage capacitance lines for applying electrical signals to liquid crystal are formed. A surface of the flat-panel display device corresponding to a display area has a transparent conductive film serving as an impedance surface. The device further includes current detecting circuits for detecting currents that flow through the impedance surface. In an interval over which the current detecting circuits detect current, at least one of the signal lines, scanning lines and storage capacitance lines is placed at a high impedance. The device reduces thickness without decline in display characteristics.

22 Claims, 19 Drawing Sheets

CURRENTS $i_1$ and $i_2$ ARE BOTH ZERO IF VOLTAGES AT BOTH ENDS OF RESISTOR ARE IN PHASE AND FINGER IS ABSENT $R = R_1 + R_2$

COMPARATIVE

COMPARATIVE

COMPARATIVE

FLAT-PANEL DISPLAY DEVICE AND ELECTRONIC APPARATUS

REFERENCE TO RELATED APPLICATION

This application is based upon and claims the benefit of the priority of Japanese patent application No. 2007-205442, filed on Aug. 7, 2007, the disclosure of which is incorporated herein in its entirety by reference thereto.

TECHNICAL FIELD

This invention relates to a flat-panel display device and an electronic apparatus. More particularly, the invention relates to a flat-panel display device having a touch sensor capable of sensing whether the surface of a display has been touched by a finger or pen and the coordinates of the touched position, as well as an electronic apparatus equipped with such a display device.

BACKGROUND

A touch sensor, which is a device that detects a position pointed at using a finger or pen, etc., or whether a pointing operation has been performed, is usually used in combination with a flat-panel display device such as an liquid crystal display (LCD) or plasma display (PDP). The output of the touch sensor is input to a computer to control an apparatus by the computer or control what is displayed on a flat-panel display device, whereby an easy-to-use man-machine interface is realized. Touch panels find practical use in game machines, PDAs, ticket machines, automatic teller machines (ATMs) and car navigation.

Analog capacitive-coupled systems, resistive-film systems, infrared systems, ultrasonic systems and electromagnetic induction systems are known as touch-sensor systems. Among these, the analog capacitive-coupled systems are classified further into those of projected capacitive and surface capacitive types. A surface-capacitive touch sensor comprises a transparent substrate, a uniform transparent conductive film formed on the substrate and a thin insulating film formed on the conductive film. When the touch sensor is driven, AC voltage is applied from the four corners of the transparent conductive film. If the touch sensor is touched by a finger, very small currents flow into the finger owing to a capacitance formed by the surface of the touch panel and the finger. These currents flow from the respective corners to the point touched. A controller determines the ratios of these currents and computes the coordinates of the position touched. With regard to techniques relating to surface-capacitive touch sensors, Patent Document 1 discloses a basic apparatus, and a well-known example relating to this is disclosed in Patent Document 2. The latest technical trends in analog capacitive-coupled systems are disclosed in Non-Patent Document 1.

In analog capacitive-coupled touch sensors of the past, a surface-capacitive touch sensor formed on a transparent substrate and a flat-panel display device are used in superimposed form. With such an arrangement, however, the fact that the touch sensor exists on the display surface results in certain problems, namely an increase in the thickness of the device itself, a rise in cost and a decline in display quality. Techniques for solving these problems are disclosed in Patent Documents 3 and 4.

Patent Document 3 discloses a device in which current detectors are attached to the four corners of a common electrode that impresses voltage upon liquid crystal and the positional coordinates of a touched portion are computed based upon currents that flow into the four corners. Patent Document 4 discloses a device comprising a liquid crystal display circuit for supplying a transparent opposing electrode with a display voltage or current; a position detecting circuit for detecting currents that flow from a plurality of locations of the transparent opposing electrode; and a switching circuit for forcing either one of these circuits into electrical conduction with the transparent common electrode. In accordance with both of these documents, the common electrode or the transparent opposing electrode performs the role of a surface-capacitive transparent conductive film and the display device need not be provided separately with a surface-capacitive touch sensor. As a result, it is maintained that the problems of an increase in the thickness of the device itself, a rise in cost and a decline in display quality are solved.

[Patent Document 1]
U.S. Pat. No. 4,293,734
[Patent Document 2]
Japanese Patent Kokai Publication No. JP-A-56-500230
[Patent Document 3]
Japanese Patent Kokai Publication No. JP-P2003-99192A
[Patent Document 4]
Japanese Patent Kokai Publication No. JP-P2003-66417A
[Patent Document 5]
Japanese Patent No. 3121592
[Non-Patent Document 1]
Yuji Mitani, Supervisor, "Technologies and Developments of Touchpanels", CMC Publishing, Dec. 27, 2004

SUMMARY OF THE DISCLOSURE

Analyses on the Background Art

The following analyses are given by the present invention. The entire disclosures of the above mentioned documents are incorporated herein by reference thereto.

According to the inventor's analyses, the display devices disclosed in Patent Documents 3 and 4 involve several problems.

A first problem is that the signal quantity relating to the position pointed at or concerning whether a pointing operation has been performed is small. The inventor has found by experimentation that in comparison with the arrangement of Non-Patent Document 1, the signal quantity obtained with the arrangements disclosed in Patent Documents 3 and 4 is small. Since the human body does not have a well-defined ground, it is difficult to determine the capacitance (impedance) of a finger by computation and experimentation, therefore, is important. An indicator of the signal quantity in the arrangement of Non-Patent Document 1 and in the arrangements disclosed in Patent Documents 3 and 4, namely the result of experimentation regarding an impedance value formed by a finger and a touch sensor, will be described later.

A second problem is that a signal that is not related to a position pointed at or not related to whether a pointing operation has been performed (this signal will be referred to as an "invalid signal"), namely noise, is large. A signal relating to the position pointed at or concerning whether a pointing operation has been performed (this signal will be referred to as a "valid signal") is a current that flows through the finger owing to capacitance formed by the touch-panel surface and finger, as mentioned above. In addition to this effective current, a current through a capacitance other than that of the finger flows in the transparent conductive film of the surface-capacitive touch sensor. In the case of the arrangements of Patent Documents 3 and 4, a pixel array circuit that opposes the transparent conductive film across the intermediary of a liquid crystal layer of several microns exists, thereby forming a large capacitance. By measuring this capacitance, the inventor has discovered that it is extremely large in comparison with the capacitance formed by the touch-panel surface and finger.

In view of the first and second problems, it is deduced that the S/N ratio of the signal relating to the position pointed at or concerning whether a pointing operation has been performed in the display device disclosed in Patent Documents 3 and 4 is very low. As a result, new issues have been discovered, namely that position coordinates cannot be detected and that the cost of the signal processing circuit is high.

A third problem is that pixel switches cannot be held in the off state. This results in a leakage current and causes a decline in display performance. In accordance with Patent Document 4, an AC voltage of 2 to 3 volts is applied to an opposing conductive film during the period of position detection. Since pixel electrodes take on a high impedance and are strongly capacitively coupled to the opposing electrode at this time, the pixel electrodes also similarly fluctuate over a range of 2 to 3 volts. Consequently, the gate-to-source voltage (Vgs) of thin-film transistors (TFTs) serving as the pixel switches fluctuates and there are instances where the switches turn on intermittently. The inventor has discovered this problem.

OBJECT OF THE INVENTION

It is a first object of the present invention to provide a combination touch sensor/flat-panel display device that is light in weight, small in size, suited to a reduction in thickness and free of any decline in display characteristics.

It is a second object of the present invention to provide this flat-panel display device at low cost.

It is a third object of the present invention to conserve resources.

In one aspect of the present invention, there is provided a flat-panel display device that comprises a display device substrate formed to have electrodes for applying electrical signals to an electro-optically responsive display element. A surface corresponding to a display area of the flat-panel display device has an impedance surface. The device further has a current detecting circuit that detects a current that flows through the impedance surface. In an interval over which the current detecting circuit detects current, at least one electrode for transmitting an electrical signal from the exterior to the interior of the display area from among the electrodes that apply the electrical signals to the display elements is placed at a high impedance.

In a second aspect of the present invention, a flat-panel display device comprises: an electro-optically responsive display element; a display device substrate on which electrodes for applying first electrical signals to the display element are formed; an opposing substrate on which an impedance surface for applying second electrical signals to the display element is formed; and a current detecting circuit that detects a current that flows through the impedance surface; wherein the display device substrate and the opposing substrate are arranged so as to oppose each other via the display element; and a linearization pattern is formed on the impedance surface.

In a third aspect of the present invention, a flat-panel display device comprises an electro-optically responsive display element; a display device substrate on which electrodes for applying electrical signals to the display element are formed; and an opposing substrate disposed at a position opposing the display device substrate via the display element; wherein a surface of the display device substrate on a side thereof opposite the opposing substrate or a surface of the opposing electrode on a side thereof opposite the display device substrate has an impedance surface; the flat-panel display device further comprising a current detecting circuit that detects a current that flows through the impedance surface.

In a fourth aspect of the present invention, there is provided an electronic apparatus on which the flat-panel display device set forth in any one of the foregoing aspects has been mounted.

The meritorious effects of the present invention are summarized as follows.

In accordance with the present invention, at least one wire or electrode disposed from the exterior to the interior of the display area from among wires or electrodes for applying electrical signals to a display element is placed at a high impedance in an interval over which the current detecting circuit detects current. As a result, the S/N ratio of a position detection signal is greatly improved. Further, the cost of the signal processing circuit can be reduced owing to this great improvement in the S/N ratio of the position detection signal. Further, switching elements on the display device substrate are held in the off state so that there is no decline in display characteristics.

Further, in accordance with the present invention, the impedance surface performs the role of a transparent conductive film in a surface-capacitive touch sensor. This means that the display device need not be provided separately with a surface-capacitive touch sensor, the thickness of the device can be reduced and resources can be conserved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A and 6B are schematic views useful in describing the position detection principle of a surface-capacitive touch sensor applied to the display device according to the first exemplary embodiment, in which FIG. 6A shows a case where a finger is present and FIG. 6B a case where the finger is absent;

FIGS. 8A and 8B are sectional views schematically illustrating the structures of display devices according to the prior art, in which FIG. 8A illustrates comparative structures described in Non-Patent Document 1 and FIG. 8B a structure that is based upon Patent Documents 3 and 4;

PREFERRED MODES

Figure 1:
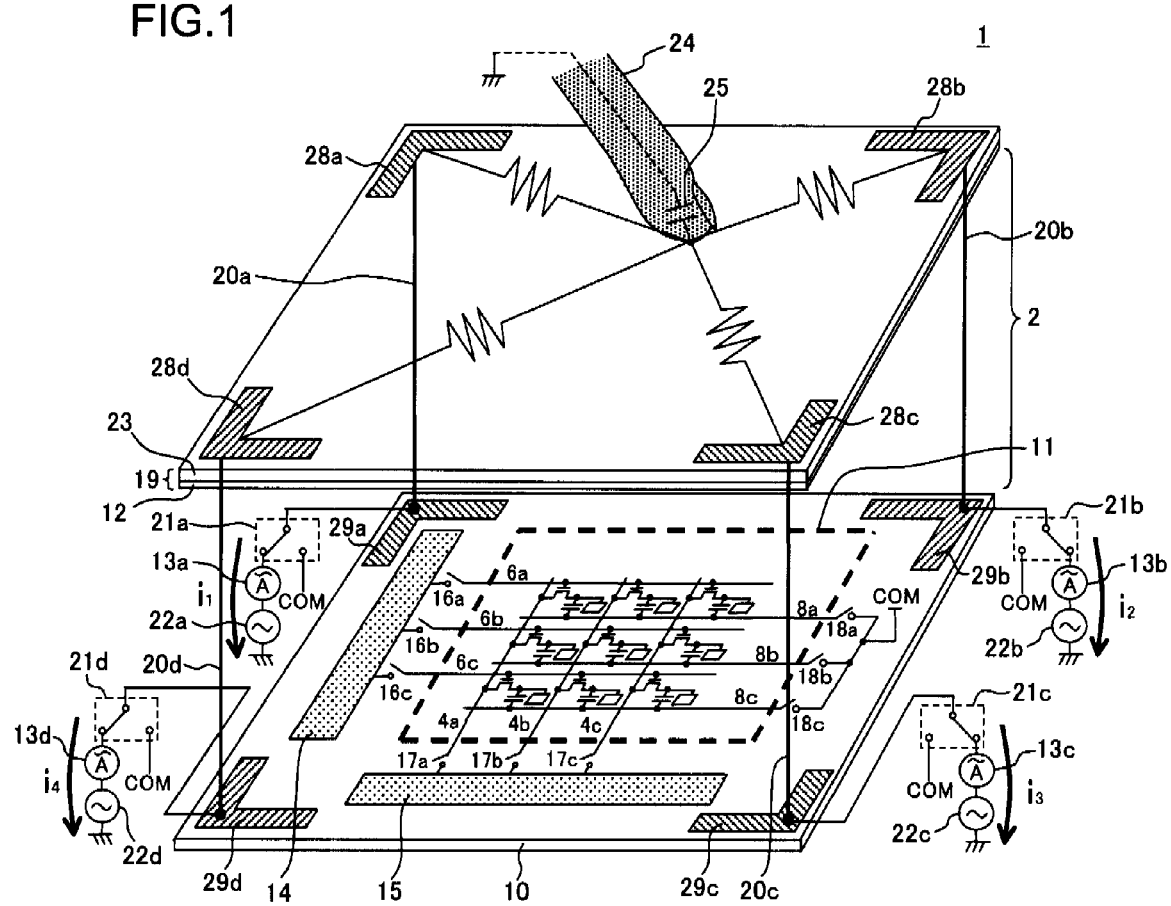
FIG. 1 is a perspective view schematically illustrating the structure of a display device according to a first exemplary embodiment of the present invention.

The flat-panel display device of the present invention further has a switch disposed on an electrode for transmitting an electrical signal from the exterior to the interior of the display area.

The flat-panel display device of the present invention further has a control circuit for controlling switching of the switch, wherein the control circuit controls at least one electrode for transmitting an electrical signal from the exterior to the interior of the display area to a high impedance in an interval over which the current detecting circuit detects current.

In the flat-panel display device of the present invention, the display device substrate has a plurality of scanning lines and a plurality of signal lines formed on a substrate, switch elements formed in the vicinity of crosspoints of the scanning lines and signal lines and pixel electrodes connected to the switch elements; a display area is formed by an array of the pixel electrodes; and a first driving circuit for driving the scanning lines and a second driving circuit for driving the signal lines attain a high impedance in an interval over which the current detecting circuit detects current.

In the flat-panel display device of the present invention, the display device substrate has capacitors one ends of which are connected to the switching elements and pixel electrodes, and capacitor lines that are connected to the other ends of the capacitors and extend to the exterior of the display area. The capacitor lines are controlled to a high impedance by controlling switching of the capacitor lines in an interval over which the current detecting circuit detects current.

In the flat-panel display device of the present invention, the capacitor lines also serve as scanning lines.

In the flat-panel display device of the present invention, the impedance surface is formed on an opposing substrate that opposes the display device substrate via the display element.

In the flat-panel display device of the present invention, the display element is any one among liquid crystal, an electrophoretic element, a charged particle, electrochromic material, gas, semiconductor and phosphor.

In the flat-panel display device of the present invention, the display element has liquid crystal as its main component, and the impedance surface comprises a transparent conductive film.

In the flat-panel display device of the present invention, the current detecting circuit applies AC voltage to the impedance surface and detects a current that flows through the impedance surface owing to application of the AC voltage.

In the flat-panel display device of the present invention, a plurality of the current detecting circuits are provided in correspondence with a plurality of locations of the impedance surface, and each current detecting circuit applies an AC voltage from the corresponding location and detects a current at the corresponding location.

The flat-panel display device of the present invention further has an indicating member for supplying current to any position on the impedance surface.

The flat-panel display device of the present invention further has a position detecting circuit that detects coordinates of point of contact of a contacting body with the impedance surface based upon an output signal from the current detecting circuit.

In the flat-panel display device of the present invention, a flexible material is used for material forming the display device substrate and opposing substrate.

In the present invention, the above-described display device is mounted on an electronic apparatus.

[First Exemplary Embodiment]

A flat-panel display device according to a first exemplary embodiment of the present invention will now be described with reference to the drawings, in which FIG. 1 is a perspective view schematically illustrating the structure of a flat-panel display device according to the first exemplary embodiment.

With reference to FIG. 1, a flat-panel display device 1 is a liquid crystal display (LCD) having a touch sensor capable of sensing whether the surface of the display has been touched by a finger or pen and the coordinates of the touched position. Besides a liquid crystal display, the flat-panel display device 1 can be one such as a plasma display (PDP), organic EL display device or the like. The flat-panel display device 1 has a display device substrate 10, an opposing substrate 19, liquid crystal 2 and a polarizer (not shown).

The display device substrate 10 is a substrate having a display area 11 in which electrodes for applying electrical signals to the liquid crystal 2 are formed. In FIG. 1, the electrodes correspond to signal lines (signal electrodes) 4a to 4c, scanning lines (scanning electrodes) 6a to 6c and storage capacitance lines (storage capacitance electrodes) 8a to 8c. A pixel matrix portion is formed in the display area 11 on the surface of the display device substrate 10 on the side thereof facing the opposing substrate 19. The pixel matrix is composed of a plurality of signal lines (4a to 4c in FIG. 1), a plurality of scanning lines (6a to 6c in FIG. 1) intersecting the signal lines, storage capacitance lines (8a to 8c in FIG. 1) disposed between the scanning lines, and pixel circuits disposed at respective ones of the crosspoints.

Each pixel circuit has a pixel switch TFT, a storage capacitor and a pixel electrode. In the pixel switch TFTs (switching elements), the scanning lines 6a to 6c, which are for controlling the on/off operation of the TFTs, are connected to the gate electrodes, the signal lines 4a to 4c, which are for supplying signals to the pixel electrodes, are connected to one of either the drain or source electrodes, and the storage capacitors and pixel electrodes are connected to the other of either the drain or source electrodes. The storage capacitors are connected to the corresponding storage capacitance lines 8a to 8c.

A scanning line driving circuit 14, signal line driving circuit 15 and storage capacitance line driving circuit that are for driving the pixel matrix are disposed at the outer periphery of the display area 11 of the display device substrate 10. The scanning line driving circuit 14 is a circuit for driving the scanning lines 6a to 6c, the signal line driving circuit 15 is a circuit for driving the signal lines 4a to 4c, and the storage capacitance line driving circuit is a circuit for applying voltage signals to the storage capacitance lines 8a to 8c and are connected to a COM terminal.

Disposed on the display device substrate 10 are electrodes 29a to 29d located at the four corners on the surface of the substrate 10 facing the side of the opposing substrate 19. The electrodes 29a to 29d are electrically connected to corresponding electrodes 28a to 28d of the opposing substrate 19 via corresponding conduction means (lines) 20a to 20d.

Provided at the outer periphery of the display area 11 in the signal paths of the scanning lines 6a to 6c are switches 16a to 16c, respectively, to make it possible to electrically place the circuitry within the pixel matrix and the circuitry at the outer periphery of the display area 11 at a high impedance. Switches 17a to 17c are provided on the signal paths of the signal lines 4a to 4c, respectively, and switches 18a to 18c are provided on the signal paths of the storage capacitance lines 8a to 8c, respectively. Switching of the switches 16a to 16c, 17a to 17c and 18a to 18c is controlled by a control circuit, not shown. As a result, the scanning lines 6a to 6c and signal lines 4a to 4c for transmitting electrical signals from the exterior to the interior of the display area 11 can be raised to a high impedance.

The display device substrate 10 is fabricated using a process employed to manufacture low-temperature polysilicon TFTs, for example. Further, the switches (16a to 16c, 17a to 17c and 18a to 18c) can be formed by analog switches using n-type TFTs. Further, the scanning line driving circuit 14 and signal line driving circuit 15 can be constructed using n-type TFTs and/or p-type TFTs.

On the other hand, the opposing substrate 19 has a glass substrate 23, a color filter (not shown) formed on the surface of the substrate on the side facing the liquid crystal 2, and a transparent conductive film 12 formed on the surface of the color filter on the side facing the liquid crystal 2. The transparent conductive film 12 is an opposing electrode formed from ITO and constitutes the impedance surface. The transparent conductive film 12 has the electrodes 28a to 28d in the vicinity of its four corners on the surface thereof on the side facing the display device substrate 10. The electrodes 28a to 28d are electrically connected to the corresponding electrodes 29a to 29d of the display device substrate 10 via conduction means 20a to 20d, which use an electrically conductive material such as silver paste. A polarizer (not shown) is disposed on the surface of the glass substrate 23 on the side thereof opposite the side facing the display device substrate 10.

Single-pole, double-throw switches 21a to 21d are electrically connected to the electrodes 29a to 29d, respectively. The switches 21a to 21d have first contacts to which respective AC voltage sources 22a to 22d are electrically connected via current detecting circuits 13a to 13d, respectively, and second contacts to which the storage capacitance line driving circuit is electrically connected via the COM terminal. The current detecting circuits 13a to 13d detect currents that flow through the transparent conductive film 12 (impedance surface) at the electrodes 28a to 28d. Signals relating to the currents detected by the current detecting circuits 13a to 13d are output toward a position detecting circuit, not shown. The position detecting circuit detects the position of contact of a finger 24 with the glass substrate 23 based upon the output signals from the current detecting circuits 13a to 13d. The AC voltage sources 22a to 22d supply AC voltages to the transparent conductive film 12 through the corresponding current detecting circuits 13a to 13d and electrodes 28a to 28d.

The liquid crystal 2 is an electro-optically responsive display element disposed between the display device substrate 10 and the opposing substrate 19.

Figure 2:
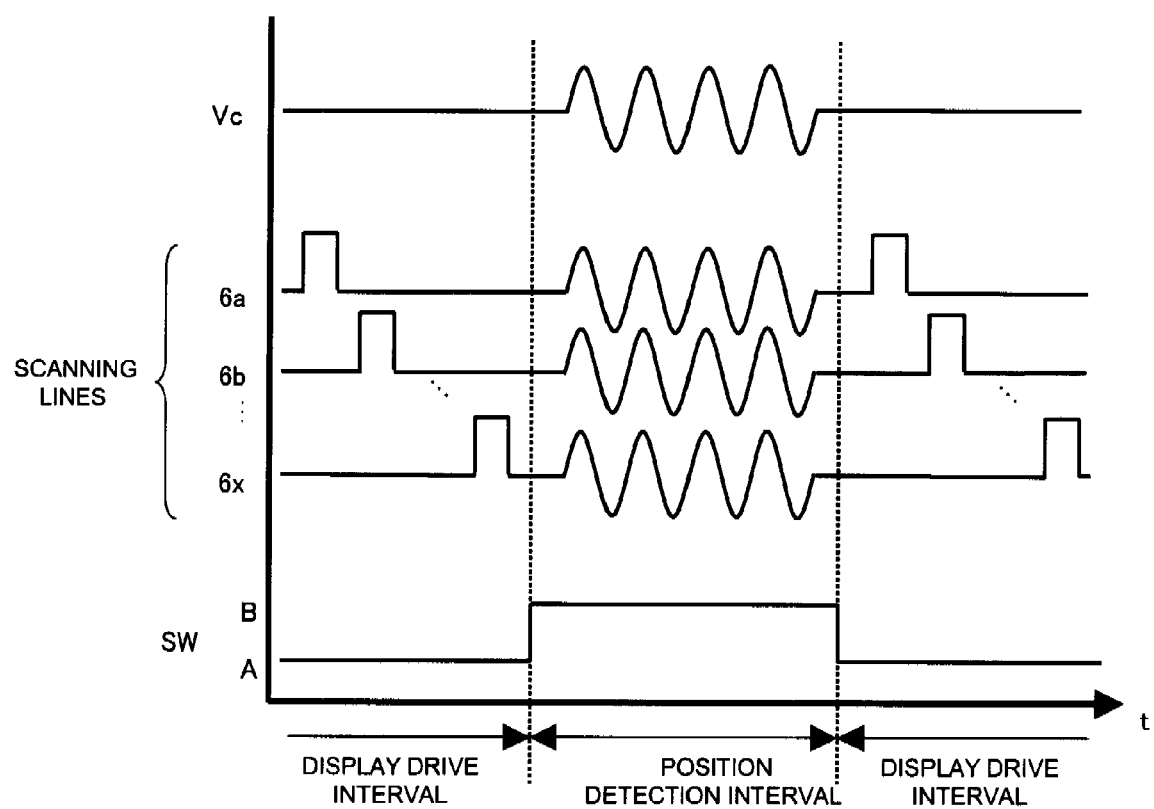
FIG. 2 is a time chart schematically illustrating an example of voltages at principal electrodes of the display device according to the first exemplary embodiment.

Next, the operation of the display device according to the first exemplary embodiment of the present invention will be described with reference to the drawings. FIG. 2 is a time chart schematically illustrating voltages at principal electrodes of the display device according to the first exemplary embodiment. Reference should be had to FIG. 1 for the structure of the display device.

In FIG. 2, Vc represents the voltage of the transparent conductive film 12 (FIG. 1); 6a, 6b to 6x represent the voltages of the respective scanning lines in the order in which they are scanned; and SW indicates the voltage of a control signal that decides the states of the switches 16, 17, 18 and 21. It should be noted that although an example in which there are three scanning lines is illustrated schematically in FIG. 1, this aspect of the device may be designed at will and 6x corresponds to the voltage of the scanning line scanned last.

With regard to driving of the flat-panel display device 1, the device has two kind of intervals, namely a display drive interval and a position detection interval. These two intervals are time-shared (time-divided). The display drive interval is a period of time for writing voltage in order to display a pixel. The position detection interval is a time period over which the current detecting circuits 13a to 13d detect current in order to detect the position of the finger 24 or detect whether a pointing operation has been performed.

The position detection interval utilizes a vertical blanking interval. The vertical blanking interval refers to an interval in which scanning of the scanning lines 6a to 6c is not carried out. In the position detection interval, the switches 16a to 16c, switches 17a to 17c and switches 18a to 18c are all placed in the OFF state, as illustrated in FIG. 1, so that the signal lines 4a to 4c, scanning lines 6a to 6c and storage capacitance lines 8a to 8c are all placed at a high impedance with respect (or relative) to wiring external to the display area 11 (namely the scanning line driving circuit 14, signal line driving circuit 15, and wiring connected to COM terminal). Further, in the position detection interval, the switches 21a to 21d are placed in the conducting state with respect to the side of the AC voltage sources 22a to 22d that include the current detecting circuits 13a to 13d. This state is achieved by placing the SW signal in FIG. 2 at the B level, i.e., the high level. In this state of the switches, namely the state of the switches shown in FIG. 1, in-phase AC voltages generated by the AC voltage sources 22a to 22d are applied to the electrodes 28a to 28d at the four corners of the transparent conductive film 12. The voltage of the transparent conductive film 12 is indicated by Vc in FIG. 2. Further, since the scanning lines 6a to 6c are at the high impedance and are capacitively coupled to the transparent conductive film 12, the voltages of the scanning lines 6a to 6c vary (or fluctuate) with the same amplitude as that of the voltage of transparent conductive film 12. The AC voltages supplied from the electrodes 28a to 28d at the four corners propagate across the entire surface of the transparent conductive film 12 so that a current flows into the finger 24 via a capacitance 25 formed by the finger 24. The absence or presence of finger 24 is detected and/or the coordinates of the position of finger 24 are detected by computing signals corresponding to currents $i_1$ to $i_4$ detected by the four current detecting circuits 13a to 13d. An example of computations is indicated by Equations (1) and (2) below.

$$x = k_1 + k_2 \cdot \frac{i_2 + i_3}{i_1 + i_2 + i_3 + i_4} \quad \text{Equation (1)}$$

$$y = k_1 + k_2 \cdot \frac{i_1 + i_2}{i_1 + i_2 + i_3 + i_4} \quad \text{Equation (2)}$$

Here x and y represent the x and y coordinates, respectively, of the position of contact; $k_1$ and $k_2$ are constants, and $i_1$ to $i_4$ represent currents detected by the current detecting circuits 13a to 13d, respectively, shown at the four corners in FIG. 1. Specifically, $i_1$, $i_2$, $i_3$ and $i_4$ correspond to current detecting circuits 13a, 13b, 13c and 13d, respectively.

In the position detection interval, the transparent conductive film 12 performs the role of the transparent conductive film of a surface-capacitive touch sensor, as mentioned hereinabove.

Figure 3:
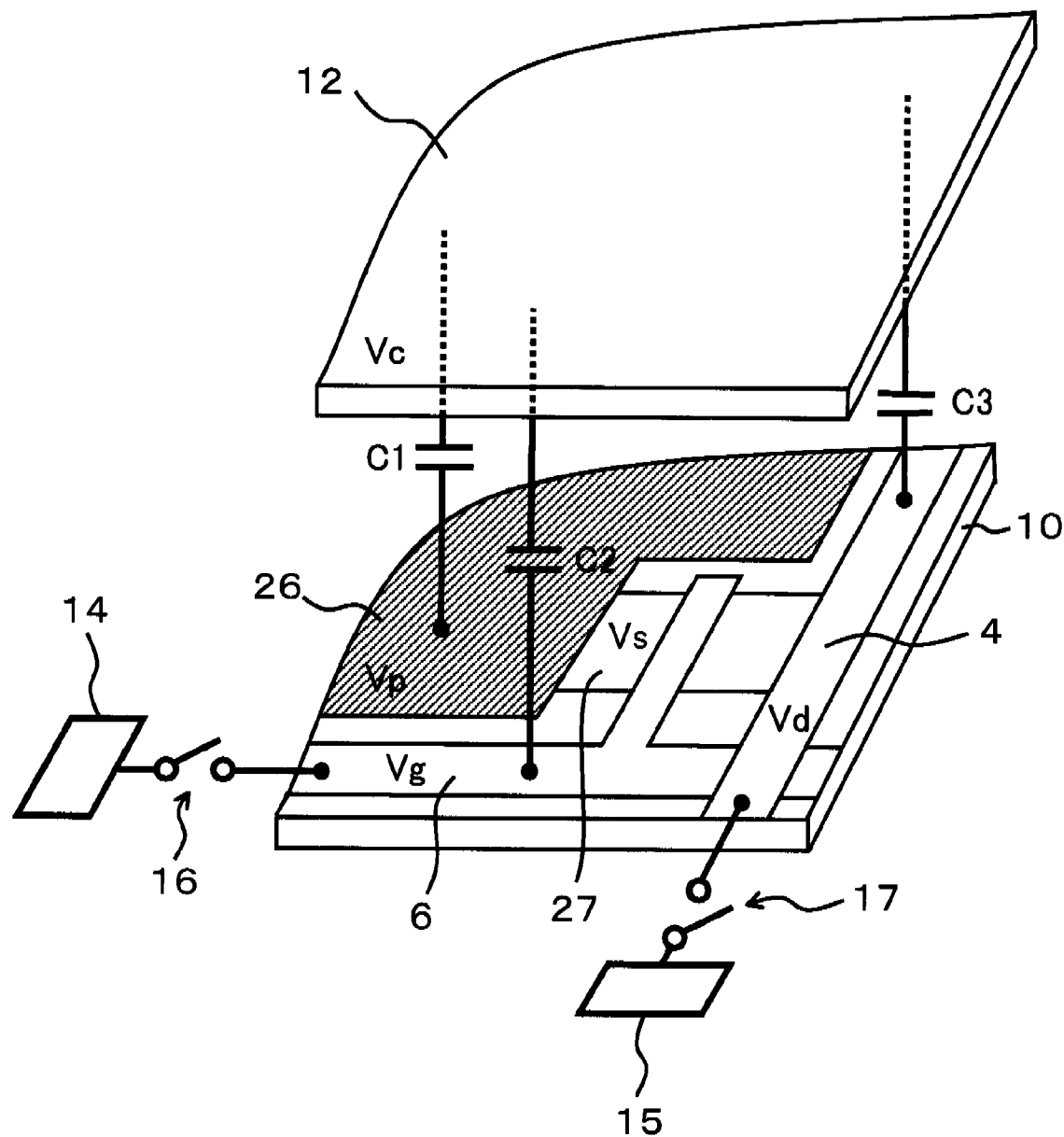
FIG. 3 is a partially enlarged perspective view schematically illustrating the configuration of a pixel circuit in the display device according to the first exemplary embodiment.

Next, reference will be had to the drawings to describe the state of a pixel circuit when AC voltage is applied to the transparent conductive film in the position detection interval of the display device according to the first exemplary embodiment of the invention. FIG. 3 is a partially enlarged perspective view schematically illustrating the configuration of a pixel circuit part in the display device according to the first exemplary embodiment.

With reference to FIG. 3, a pixel electrode 26 and signal electrode 4 are connected via a TFT switch in the pixel circuit. The on/off operation of the TFT switch is controlled by the control signal of scanning electrode 6. The signal electrode 4 is connected to the signal line driving circuit 15 via switch 17, and the scanning electrode 6 is connected to the scanning line driving circuit 14 via switch 16. Symbols Vc, Vp, Vs, Vg and Vd indicated on the respective electrodes in FIG. 3 represent the voltages of these electrodes. Capacitors C1, C2 and C3 indicate the capacitance between pixel electrode 26 and transparent conductive film 12, the capacitance between scanning electrode 6 and transparent conductive film 12, and the capacitance between signal electrode 4 and transparent conductive film 12, respectively.

Figure 4:
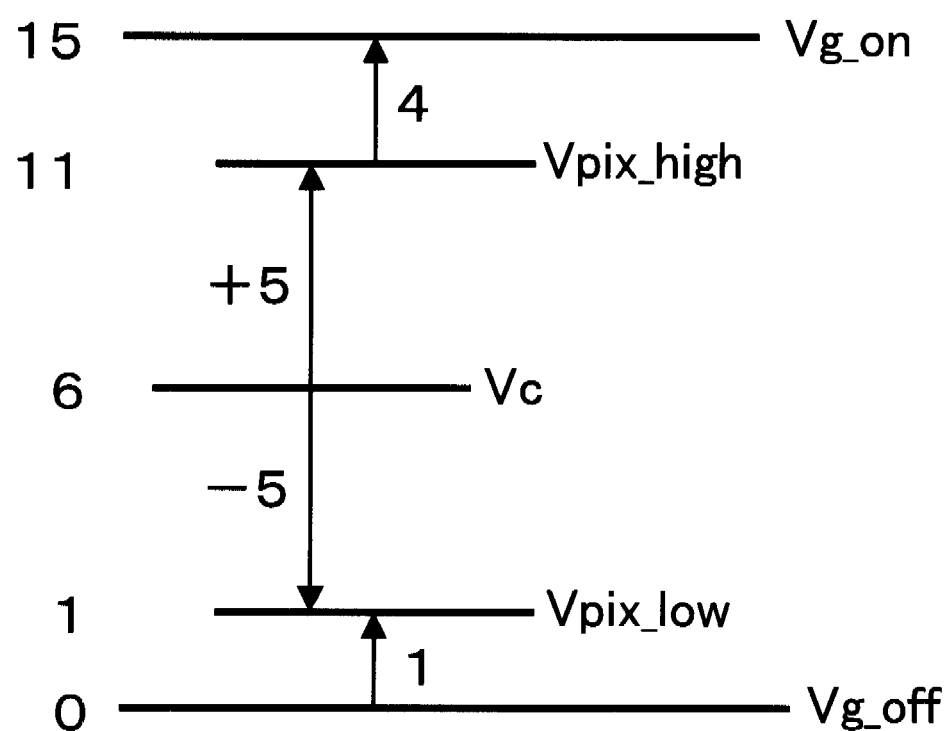
FIG. 4 is a diagram illustrating driving conditions in a display drive interval of the display device according to the first exemplary embodiment.

Next, reference will be had to the drawings to describe driving voltage set (or design) values in the display drive interval of the display device according to the first exemplary embodiment of the invention. FIG. 4 is a diagram illustrating driving conditions in the display drive interval of the display device according to the first exemplary embodiment.

In the driving method applied in the display drive interval, the voltage Vc of the transparent conductive film 12 (i.e., the opposing electrode) is held fixed and a voltage of 5V at maximum is applied to the liquid crystal with the polarity of the voltage inverted with respect to the voltage Vc. The voltage Vc of the opposing electrode is made 6V, and a voltage of 11V, which is the result of adding 5V to Vc, becomes the maximum voltage (Vpix_high) applied to the pixel electrode 26 via the signal electrode 4. A voltage of 1V, which is the result of subtracting 5V from the voltage Vc of the opposing electrode, becomes the minimum voltage (Vpix_low). Taking leakage current of the TFT switch into consideration, gate voltage (Vg_off) at switch-off time is made 0V so that maximum gate-to-source voltage at switch-off time will be −1V. Further, gate voltage (Vg_on) at switch-on time is made 15V so that a sufficient ON current will be obtained.

Figure 5:
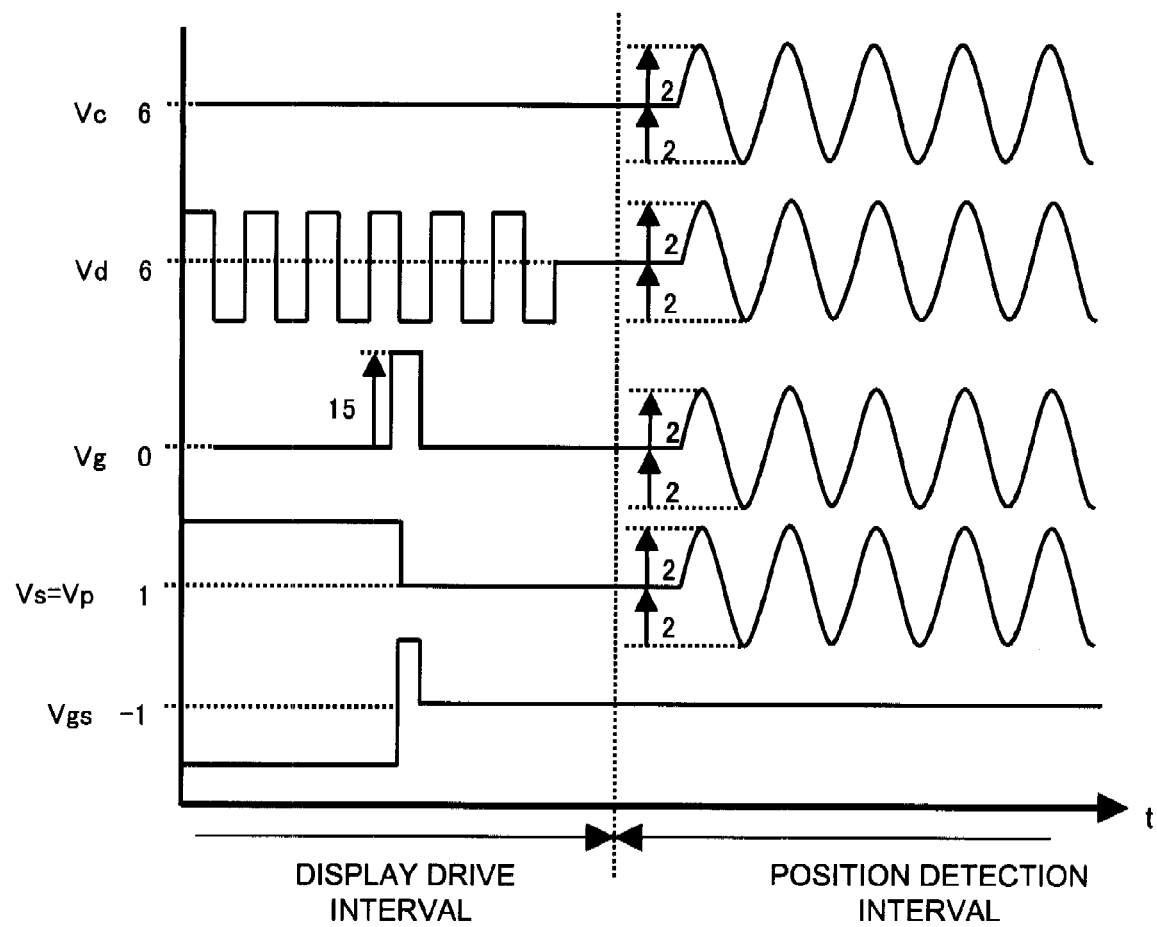
FIG. 5 is a time chart schematically illustrating an example of voltages at electrodes in a case where the display device of the first exemplary embodiment is driven under the driving conditions of FIG. 4.

Next, reference will be had to the drawings to describe the voltages at the electrodes in a case where the display device according to the first exemplary embodiment of the invention is driven under the driving conditions of FIG. 4. FIG. 5 is a time chart schematically illustrating an example of voltages at the electrodes in a case where the display device of the first exemplary embodiment is driven under the driving conditions of FIG. 4.

With reference to FIG. 5, a positive pulse is applied to the gate voltage Vg and 1V is written to a pixel electrode voltage Vp in the display drive interval. The switches 16, 17 are then turned off and a transition is made to the position detection interval. In the position detection interval, AC voltage is applied to the transparent conductive film 12, as set forth above. Here an AC voltage (Vc in FIG. 5) having an offset voltage of 6V and an amplitude of 2V is applied. At this time the electrodes that oppose the transparent conductive film 12 across a 4-micron liquid crystal layer, namely the pixel electrode 26, scanning electrode 6 and signal electrode 4, are at the high impedance and are capacitively coupled to the transparent conductive film 12 via capacitors C1, C2, C3, respectively. As a result, the pixel electrode voltage Vp, scanning electrode voltage Vg and signal electrode voltage Vd fluctuate (oscillate) with an amplitude the same as that of the voltage Vc of the transparent conductive film. Accordingly, in the example depicted in FIG. 5, the signal electrode voltage Vd becomes a voltage having an offset voltage of 6V and an amplitude of 2V since it is at the high impedance at 6V. Similarly, the scanning electrode voltage Vg has an offset voltage of 0V and an amplitude of 2V. The pixel electrode voltage Vp has an offset voltage of 1V and an amplitude of 2V if a case where Vp is minimum is taken as an example. It should be noted that since the pixel electrode 26 is connected to the source electrode 27 of the TFT switch, the source electrode voltage Vs of the TFT switch is equal to the pixel electrode voltage Vp. Thus, since the voltages of all electrodes in the pixel circuit fluctuate in conformity with the amplitude of the voltage Vc of transparent conductive film 12, the gate-to-source voltage Vgs of the TFT switch is held at the voltage in effect at the end of the display interval, namely at −1V in this example, even in the position detection interval as well. In other words, in the position detection interval, even though AC voltage is applied to the transparent conductive film 12, the voltages of all electrodes of the pixel circuit fluctuate at an amplitude the same as that of the voltage of transparent conductive film 12, and therefore the voltage (Vc-Vp) applied to the liquid crystal 2 and the gate-to-source voltage Vgs of the TFT switch do not fluctuate. As a result, driving applied in the position detection interval is not a cause of a decline in image quality.

In the display drive interval, on the other hand, each switch takes on a state that is the opposite (reverse) of that shown in FIG. 1. That is, the switches 16a to 16c, switches 17a to 17c and switches 18a to 18c are all placed in the ON state so that the signal lines 4a to 4c, scanning lines 6a to 6c and storage capacitance lines 8a to 8c are placed at a low impedance with respect to the wiring external to the display area 11 (namely the scanning line driving circuit 14, signal line driving circuit 15, and wiring connected to COM terminal). Further, the switches 21a to 21d are placed in the conducting state with respect to the side of the COM terminal. This state is achieved by placing the SW signal in FIG. 2 at the A level, i.e., the low level. In this state of the switches, the scanning lines 6a to 6c are scanned in regular order and voltage for display purposes is written to the pixels through the signal lines 4a to 4c in a manner similar to that of a conventional active matrix LCD. In the display drive interval, a voltage similar to that of the opposing electrode in the conventional LCD is supplied to the transparent conductive film 12 from the COM terminal. That is, the transparent conductive film 12 performs the role of the opposing electrode, and the voltage for display purposes is written by this opposing electrode and the pixel electrode 26 to the liquid crystal 2 present between these electrodes.

In accordance with the first exemplary embodiment, in the position detection interval, the circuitry within the pixel matrix is placed at a high impedance with respect to the circuitry external to the pixel matrix. When AC voltage is applied to the transparent conductive film 12, therefore, parasitic capacitance as seen from the transparent conductive film 12 becomes extremely small. As a result, the S/N ratio of the signals that are output from the current detecting circuits 13a to 13d is improved by two orders of magnitude in comparison with the prior art.

The effects mentioned above will be described below, along with a contrast with the prior art, while the S (signal) and N (noise) of the S/N ratio are clarified.

Figure 6A:
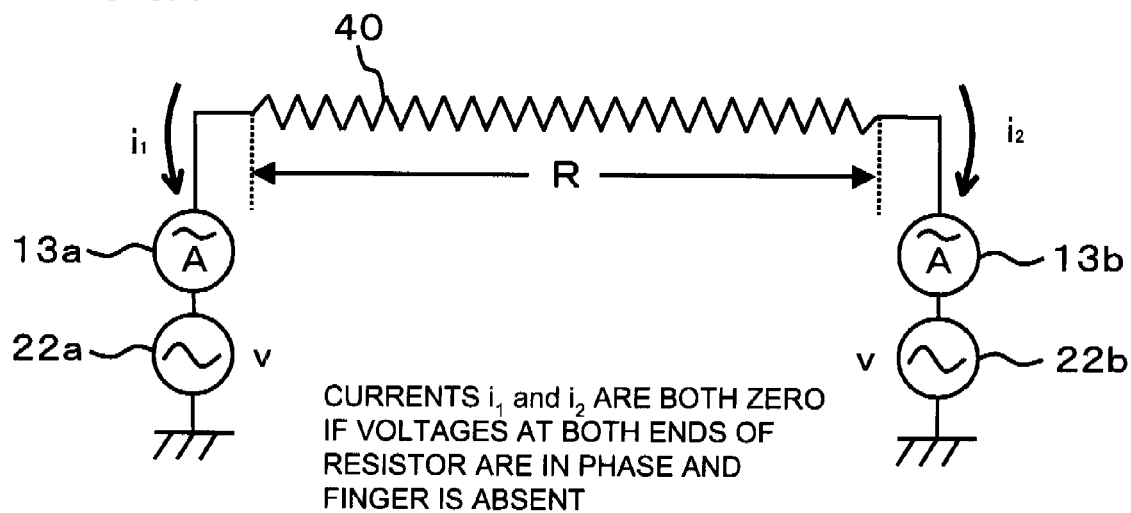
Figure 6B:
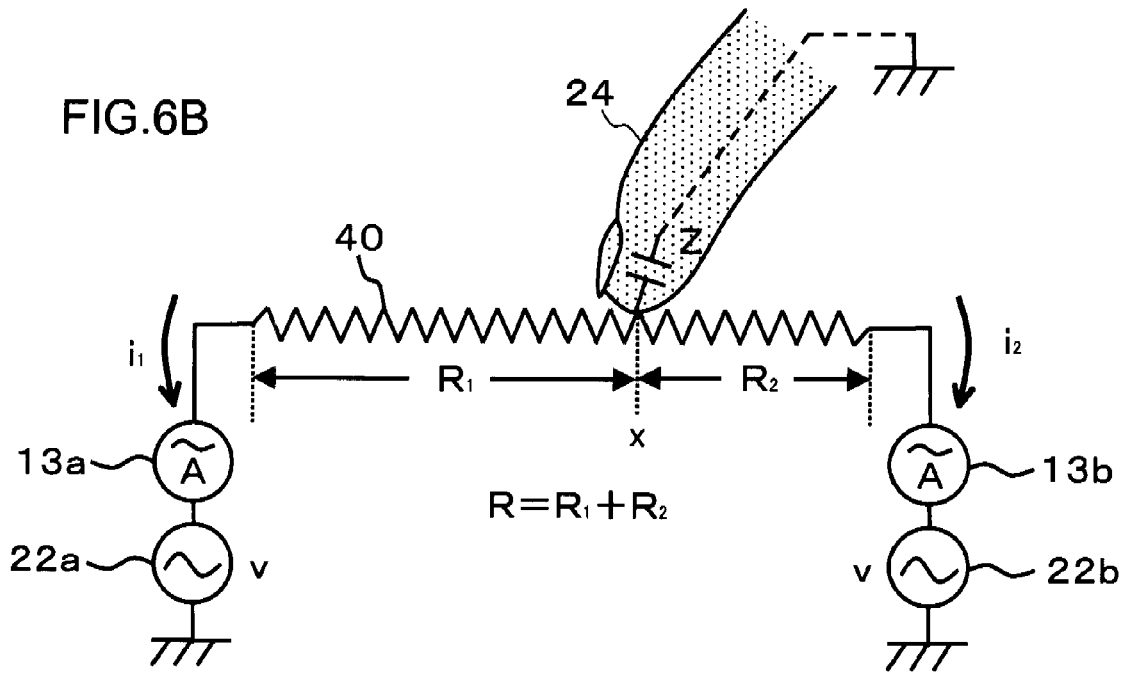

First, reference will be had to the drawings to describe the position detection principle of the surface-capacitive touch sensor applied to the display device according to the first exemplary embodiment of the present invention. FIGS. 6A and 6B are schematic views useful in describing the position detection principle of a surface-capacitive touch sensor applied to the display device according to the first exemplary embodiment, in which FIG. 6A shows a case where a finger is absent and FIG. 6B a case where the finger is present. In order to simplify the explanation, the position detection principle along the direction on one dimension will be described.

FIG. 6A illustrates an arrangement in which the current detecting circuit 13a and AC voltage source 22a are connected to one end of a resistor 40 and the current detecting circuit 13b and AC voltage source 22b are connected to the other end. If in-phase AC voltages are applied to both ends of the resistor 40, no current will flow through the resistor 40 and therefore $i_1$, $i_2$ will both be zero.

If finger 24 is placed on the resistor 40, as shown in FIG. 6B, the finger 24 can be indicated in the form of a model grounded via an impedance Z. Accordingly, $i_1$, $i_2$ can be expressed by the following equations, respectively:

$$i_1 = \frac{v \cdot R_2}{R \cdot Z + R_1 \cdot R_2} \quad \text{Equation (3)}$$

$$i_2 = \frac{v \cdot R_1}{R \cdot Z + R_1 \cdot R_2} \quad \text{Equation (4)}$$

Here $R_1$, $R_2$ represent resistance values from the position of finger 24 to the respective ends of the resistor 40. From this the position x ($0 \leq x \leq 1$) can be found using the following equation:

$$x = \frac{R_1}{R} = \frac{i_2}{i_1 + i_2} \quad \text{Equation (5)}$$

Although Equation (5) does not include the impedance Z, the currents i1, i2 do include Z and this is a signal for position detection. The inventors investigated Z in this exemplary embodiment by experimentation. Specifically, with the structure of the first exemplary embodiment in which a polarizer (polarizing plate, not shown), glass substrate 23 (FIG. 1) and transparent conductive film 12 (FIG. 1) are stacked, the Z that prevails when the finger 24 (FIG. 2) is placed on the structure on the side of the polarizer was obtained by experimentation. Since Z is an impedance formed by interposition of the glass substrate and polarizer into opposition, it can be dealt with as capacitance C. The value of C obtained was 6.7 pF with a glass-substrate thickness of 0.7 mm and a polarizer thickness of 0.2 mm. In other words, the S (effective signal component) of the S/N ratio of the signals that are output from the current detecting circuits 13a, 13b is a current that flows via the capacitance C.

For reference purposes, the value of capacitance C is 30 pF in the case of the arrangement described in Non-Patent Document 1. The fact that "the signal is small" means that in a case where the arrangement of Non-Patent Document 1 is compared with Patent Document 3 or 4, capacitance becomes small in this fashion and is accompanied by diminution of the effective signal, as discussed in the analyses on the background art as the second problem.

Figure 7:
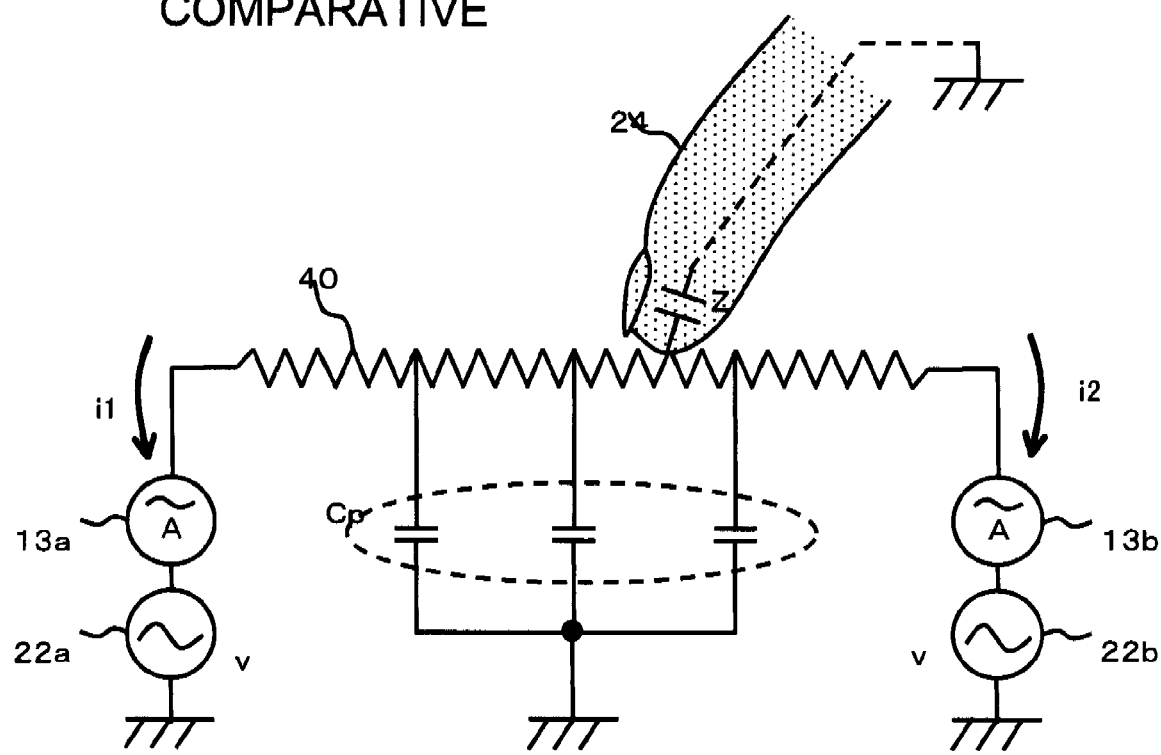
FIG. 7 is a schematic view of a comparative structure useful in describing the position detection principle of a surface-capacitive touch sensor applied to a display device according to the background art.

The noise component will be described next. In a case where the background art is implemented as a comparative example according to the position detection principal illustrated in FIGS. 6A, 6B, in addition to the impedance Z ascribable to finger 24, a parasitic capacitance Cp is connected to the resistor 40, as illustrated in FIG. 7. The outputs of the current detecting circuits 13a, 13b are the result of superimposing currents obtained via the parasitic capacitance Cp, and the currents obtained via the parasitic capacitance Cp do not include information relating to the position of finger 24. That is, the currents obtained via the parasitic capacitance Cp are noise components. The inventor determined the value of the parasitic capacitance Cp by experimentation.

Figure 8A:
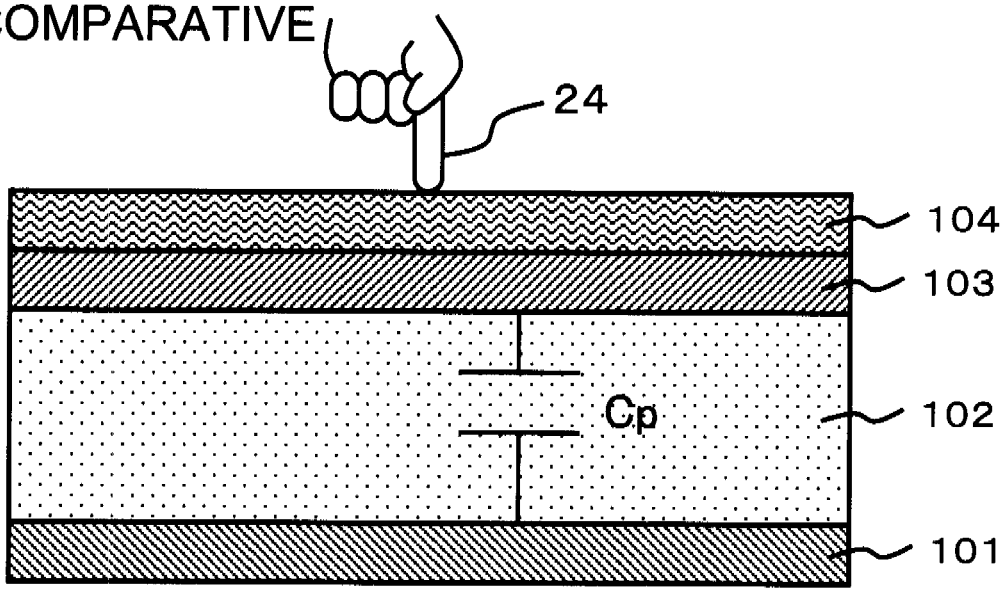

In the case of the arrangement described in Non-Patent Document 1 and illustrated in FIG. 8A as a comparative structure, the parasitic capacitance Cp is formed by a transparent conductive film 103 and shield layer 101 formed on a glass substrate 102. In a size suited to an LCD having a 2.1-inch diagonal, the value of this parasitic capacitance Cp was found to be 29 pF. On the other hand, in the case of the arrangement based upon Patent Documents 3, 4 and illustrated in FIG. 8B as a comparative structure, the parasitic capacitance Cp is formed by a transparent conductive film 204 and an electrode constituting a pixel matrix circuit 202, with the film and electrode sandwiching liquid crystal 203 between them. The magnitude of the capacitance was found to be 15000 pF in this case. The fact that noise is large means that in a case where the arrangement of Non-Patent Document 1 is compared with Patent Document 3 or 4, parasitic capacitance becomes much larger in this manner and is accompanied by an increase in noise, as mentioned in the analyses on the background art.

As a result of the foregoing, the S/N ratio in the case where Patent Documents 3, 4 are implemented is as follows:

S/N=(value of current that flows through capacitance due to finger)/(value of current that flows through parasitic capacitance Cp)=(6.7 pF)/(15000 pF)≈4×10$^{-4}$ In other words, the output signals of the current detecting circuits contained almost no components relating to position detection, it was impossible to detect position from the signals having the above-mentioned S/N ratio and a very costly signal processing circuit was required. Alternatively, because of the low S/N ratio, a prolonged period of time was required to achieve detection of position coordinates for the purpose of calculating signals over a plurality of cycles.

Figure 9:
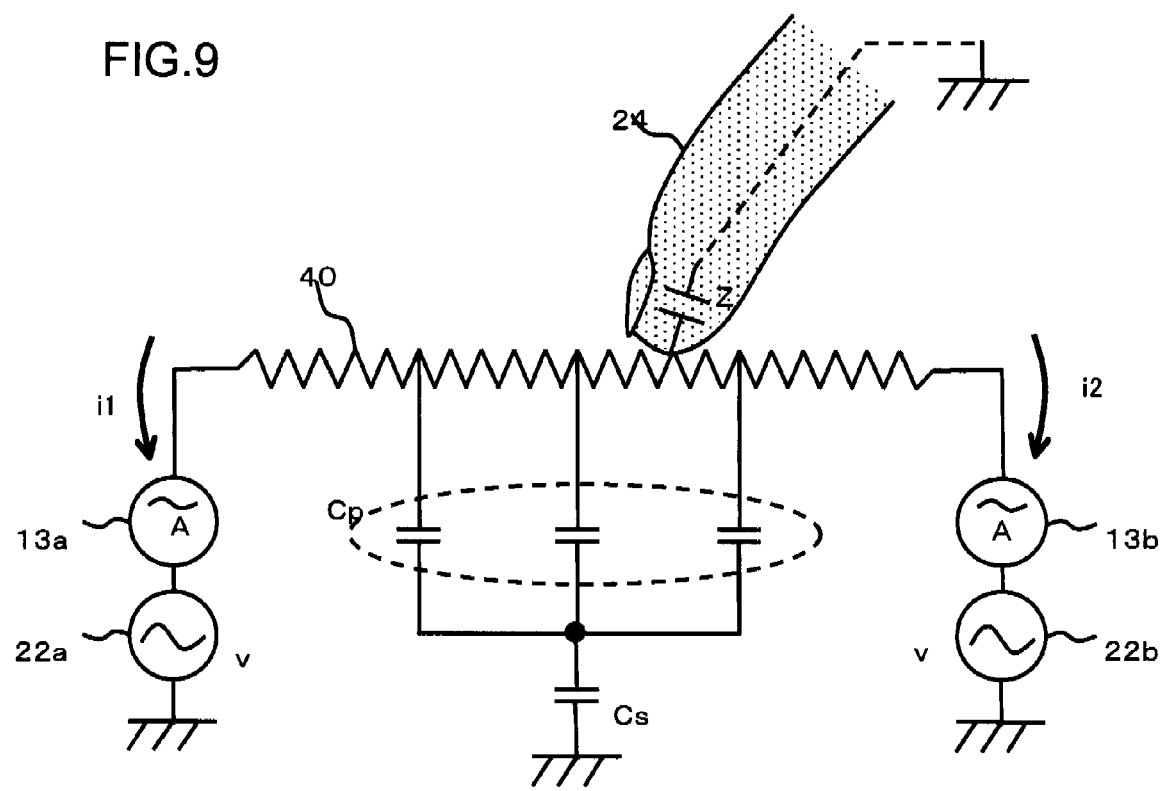
FIG. 9 is a circuit diagram useful in describing the position detection principle of the display device according to the first exemplary embodiment.

On the other hand, with the display device according to the first exemplary embodiment of the present invention, the switches are placed in the states shown in FIG. 1 in the position detection interval. That is, the switches 16a to 16c, switches 17a to 17c and switches 18a to 18c are all placed in the OFF state so that the signal lines 4a to 4c, scanning lines 6a to 6c and storage capacitance lines 8a to 8c are placed at a high impedance with respect to wiring external to the display area 11 (namely the scanning line driving circuit 14, signal line driving circuit 15, wiring connected to and COM terminal). A circuit diagram based upon this principle is shown in FIG. 9. Although the parasitic capacitance Cp in FIG. 9 is the same as the parasitic capacitance Cp of FIG. 7, one end of the parasitic capacitance Cp is not connected directly to a fixed potential (AC ground) but is instead connected to a fixed potential (AC ground) via a capacitance Cs in series therewith. The capacitance Cs is the total value of capacitance values that prevail when the switch group surrounding the pixel matrix in FIG. 1 is turned off. In the first exemplary embodiment, a prototype of an LCD having a diagonal of 2.1 inches and a pixel configuration of 176×RGB×240 was fabricated, and the value of Cs was 100 pF. As a result, the parasitic capacitance of the resistance element becomes a series connection of Cp and Cs and the value thereof is 100 pF. Accordingly, the S/N ratio in the first exemplary embodiment is as follows:

$$S/N = (6.7 \text{ pF})/(100 \text{ pF}) = 6.7 \times 10^{-2}$$

Figure 8B:
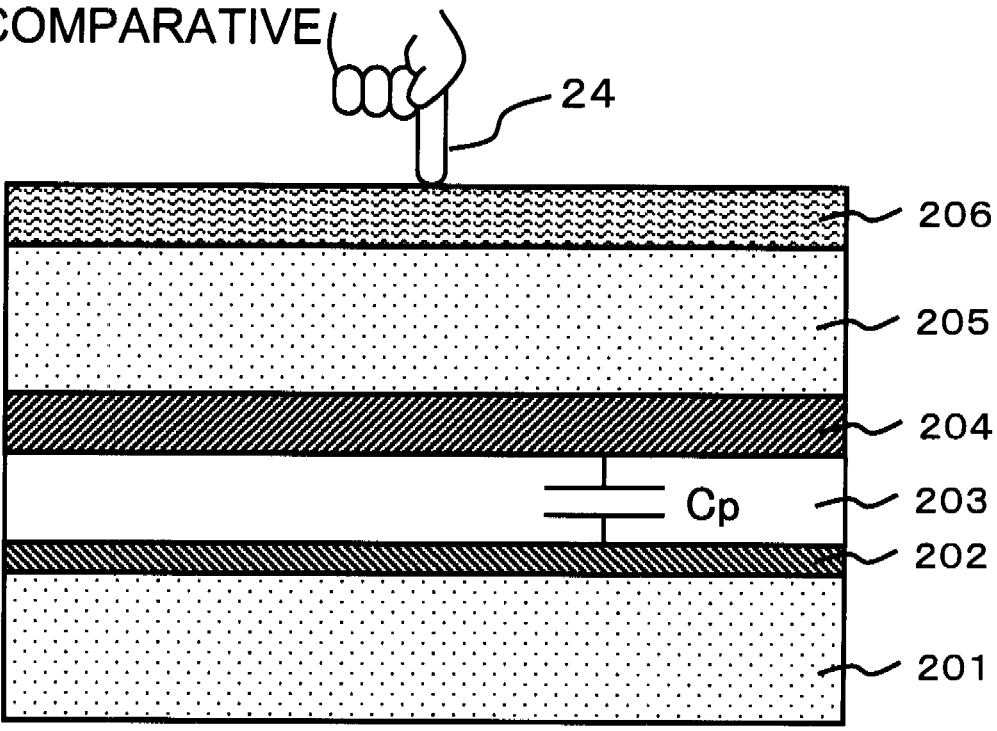

In other words, it was confirmed that the first exemplary embodiment has an outstanding effect, namely an improvement in the S/N ratio of two orders of magnitude in comparison with the arrangement based upon Patent Documents 3 and 4 (see FIG. 8B). As a result, it is possible to detect position coordinates and a costly signal processing circuit is unnecessary. In addition, the time required to detect position is shortened.

In the explanation rendered above with reference to FIG. 5, it was stated that in the case of the arrangement of the first exemplary embodiment, the gate-to-source voltage Vgs of the TFT switch is held at the voltage in effect at the end of the display interval, namely at −1V, even in the position detection interval. The condition to obtain this −1V is the case where the voltage written to the pixel is at minimum, i.e., Vpix_low (1V) shown in FIG. 4.

Figure 10:
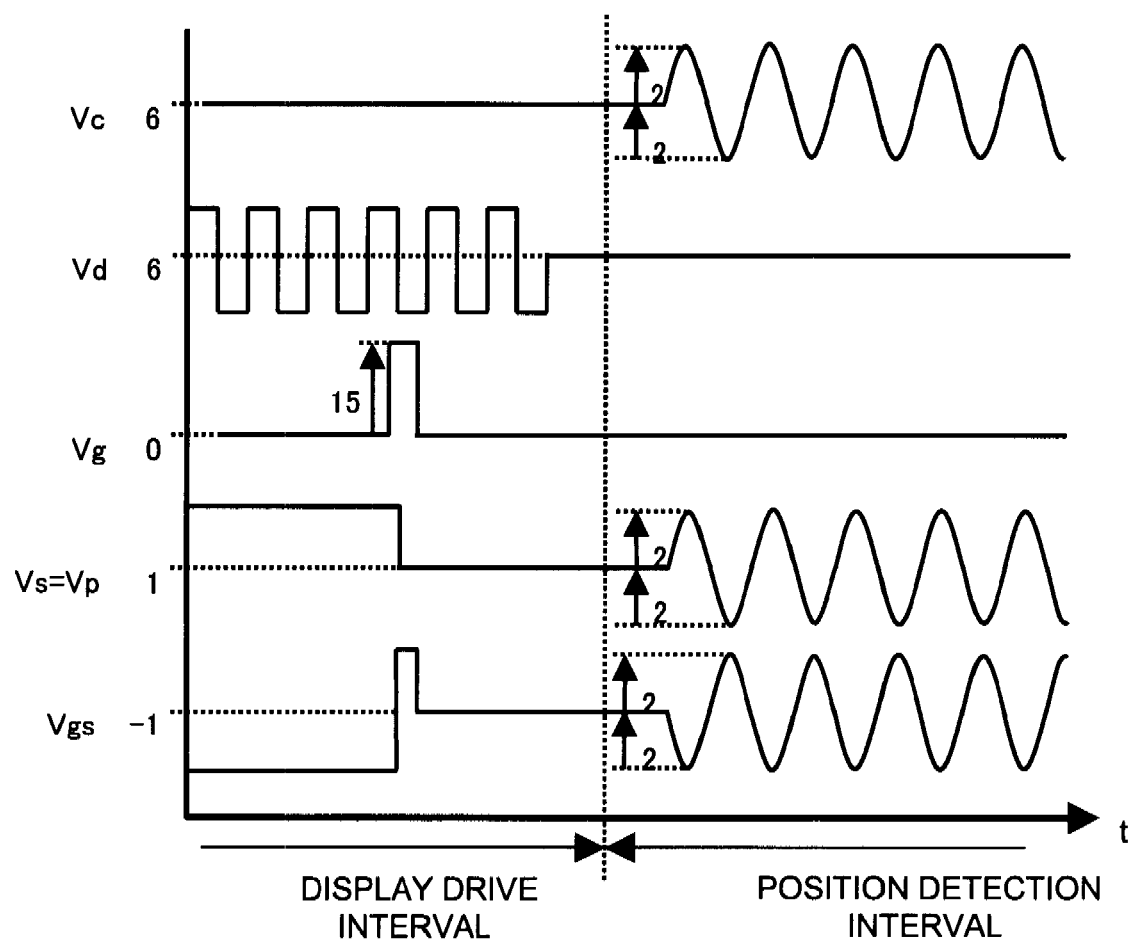
FIG. 10 is a time chart schematically illustrating voltages of electrodes in a case where the display device of the prior art is driven.

On the other hand, in the case of Patent Documents 3 and 4, Vgs fluctuates. Specifically, with reference to FIG. 10 showing a comparative wave chart, in the position detection interval, the pixel electrode is at the high impedance and is capacitively coupled to the transparent conductive film via the capacitance, as a consequence of which the pixel electrode voltage Vp fluctuates with an amplitude the same as that of the voltage Vc of the transparent conductive film. When alternating current having an amplitude of 2V is applied to the voltage Vd of the transparent conductive film, therefore, the pixel electrode voltage Vp also fluctuates with the amplitude of 2V correspondingly. The scanning line voltage Vg, on the other hand, is fixed at 0V, which is the voltage that turns off the pixel switch. As a result, the gate-to-source voltage Vgs of the TFT switch is made an offset voltage of −1V and fluctuates at the voltage amplitude of 2V. Consequently, the TFT switch cannot continue to be held in the OFF state and a decline in image quality arises.

By contrast, in the case of the first exemplary embodiment, Vgs of the transistor does not fluctuate, as set forth above (see FIG. 5). The invention therefore affords an outstanding effect, namely the fact that drive performed in the position detection interval does not lead to a decline in image quality.

It should be noted that in the first exemplary embodiment, n-type TFTs are used as the switches 16a to 16c, 17a to 17c, 18a to 18c that establish the high impedance electrically between the interior or exterior of the display area 11. However, these switches may just as well be p-type TFTs or transfer gates obtained by combining n- and p-type transistors. Further, although the driving circuit is formed by n- and p-type TFTs, the circuit may just as well be formed using either one of these types, namely solely of p-type TFTs or solely of n-type TFTs. These types of switches are selectable. In a case where the present invention is implemented, therefore, it is possible to provide the switches without increasing the cost of manufacture. More specifically, as described in the first exemplary embodiment, in a case where the signal line driving circuit or scanning line driving circuit is constructed using n- and p-type polysilicon TFTs, the switches can be provided without increasing the manufacturing steps regardless of whether n-type switches, p-type switches or transfer gates that are a combination of the n- and p-types are selected. In a case where n- or p-type switches are selected, circuit area is reduced in comparison with transfer gates, and an additional effect is that control is simplified. A further effect is that parasitic capacitance when the switches are off is kept low. As a result, an effect obtained is suppressed deterioration of the S/N ratio of the signal relating to position or concerning whether a pointing operation has been performed. In particular, in the case of n-type switches, ON resistance is low in comparison with p-type switches and therefore it is possible to further reduce switch size. This has the effect of suppressing parasitic capacitance even further. From the standpoint of suppressing driving voltage, on the other hand, transfer gates are desirable. In a case where the circuitry, except for the switches that electrically place the interior and exterior of the display area at the high impedance, are composed of transistors of one type, namely the n-type or p-type, in the display device, the switches can be provided without increasing the number of manufacturing steps by forming the switches using transistors of either one of these types correspondingly.

Further, although the switches 16a to 16c, 17a to 17c and 18a to 18c are provided external to the scanning line driving circuit 14 and external to the signal line driving circuit 15, these may be included within these driving circuits. If the switches are included in the scanning line driving circuit 14, this can be achieved by adopting a circuit configuration in which a three-value output (high level, low level and high impedance) is possible, by way of example. In this case, a clocked inverter circuit, for example, can be applied. Further, circuit area can be reduced by adopting an arrangement in which control that places the transistors in the output stages of these driving circuits at a high impedance is exercised and the transistors in the output stages are made to serve also as switches.

Further, in the first exemplary embodiment, the transparent conductive film 12 exists at a position where it opposes the positions at which the scanning line driving circuit 14 and signal line driving circuit 15 are placed. However, from the standpoint of reducing the parasitic capacitance of the transparent conductive film, it is preferred that the area of the transparent conductive film 12 be made the smallest necessary. Accordingly, the transparent conductive film 12 at the positions opposing the positions of the driving circuits 14 and 15 may be removed.

Further, in the first exemplary embodiment, the transparent conductive film 12 exists at a position where it opposes the positions at which the scanning line driving circuit 14 and signal line driving circuit 15 are placed. In this case, from the standpoint of reducing the parasitic capacitance of the transparent conductive film 12, the power source lines of the driving circuits 14, 15 may be placed at the high impedance in the position detection interval. In this case, owing to the existence of the transparent conductive film, a capacitance is formed between the electrodes forming the power source lines or circuitry and the transparent conductive film, and this works to maintain the potential relationship among the nodes within the circuitry. Accordingly, even in the case of dynamic circuits and resistor circuits, stored content is not destroyed during the high impedance and it is possible to resume continuous operation by establishing a low impedance again after the high impedance.

Further, in the first exemplary embodiment, the display device substrate 10 is fabricated using a low-temperature polysilicon TFT process. However, the display device substrate 10 may be fabricated by an amorphous-silicon TFT process. Processes other than the TFT process that may be used to form the display device substrate are, e.g., a microcrystal-silicon TFT process, an oxide TFT process, an organic TFT process, and a process for forming a TFT after a silicon thin film is transferred onto a supporting substrate. As means for electrically placing the interior and exterior of the display area 11 at the high impedance, this function may be integrated in a driver LSI of bulk silicon, or an amorphous silicon switch may be formed on the display device substrate 10. Furthermore, implementation is possible by mounting a switch-array LSI, which has been fabricated using the low-temperature polysilicon TFT process, on the display device substrate 10 and making a connection to the exterior of the display device substrate. Further, the display device substrate 10 may be formed on a monocrystalline silicon substrate (bulk silicon) or formed using an SOI substrate. Further, after the circuitry is formed by the polysilicon TFT process, amorphous silicon TFT process, bulk silicon process or SOI process, etc., the circuitry may be transferred to another substrate to thereby form the display device substrate 10.

Figure 11:
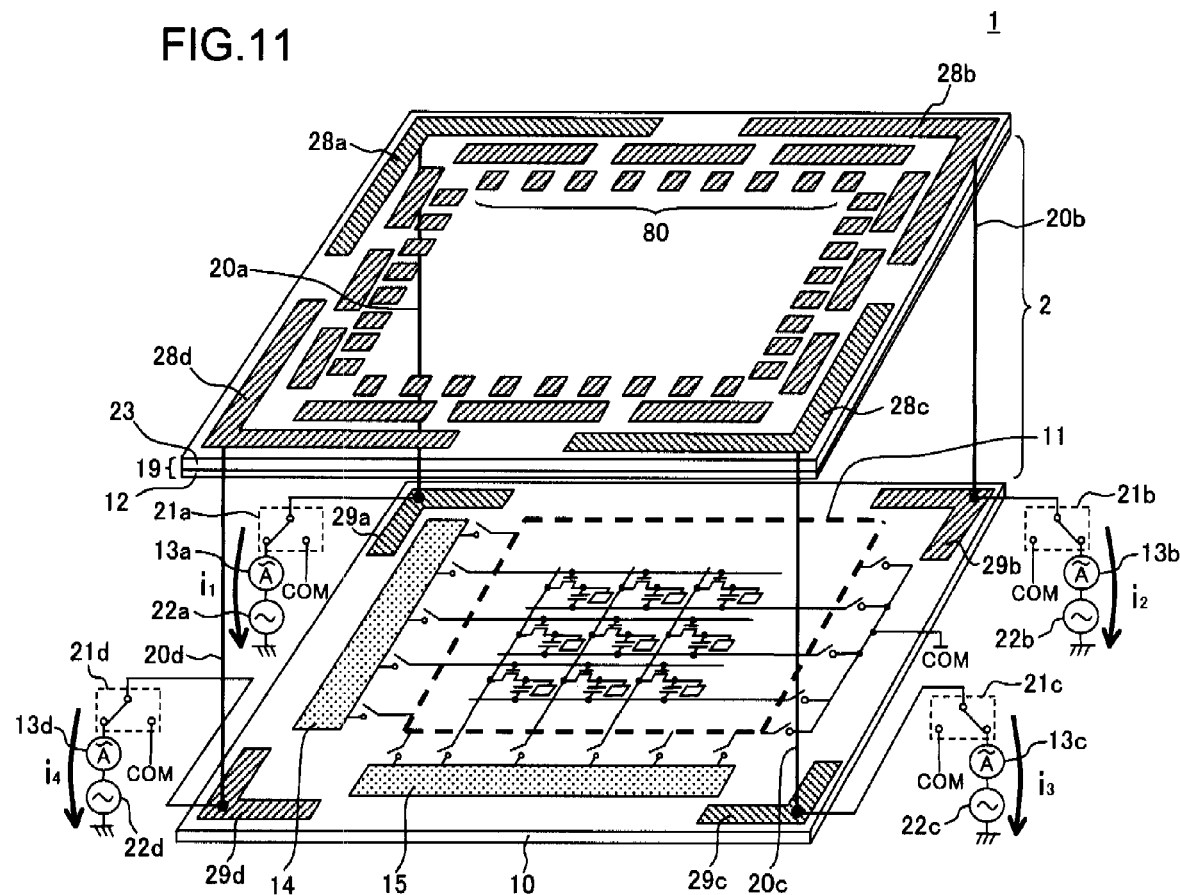
FIG. 11 is a perspective view schematically illustrating the structure of a first modification of the display device according to the first exemplary embodiment.

Further, a so-called linearization pattern may be formed on the transparent conductive film 12. With reference to FIG. 11 in this regard, a linearization pattern 80 is provided in order to uniformalize an electric field curve formed on the surface of the transparent conductive film 12. For example, this is described in Patent Document 5. In this exemplary embodiment, the linearization pattern is formed on the transparent conductive film 12, which is an electrically conductive film for position detection. The result is an improvement in linearity between position and current signals in position detection.

Further, in the first exemplary embodiment, the transparent conductive film 12 is provided on the surface of the glass substrate 23 on the side thereof facing the liquid crystal 2. However, the transparent conductive film 12 may be provided on the opposite-side surface of the glass substrate 23. Even in this case the effect of reducing the parasitic capacitance of the transparent conductive film 12 is obtained by applying the present invention. The transparent conductive film 12 may be formed on the glass substrate 23 by a sputtering method or vapor-deposition method, or may be formed by affixing a sheet. Further, a polarizing plate (polarizer) may be furnished with electrical conductivity and this can be used as a position-detecting conductive film of a surface-capacitive touch sensor. These methods are particularly suitable in a case where use is made of an in-plane switching (IPS) liquid crystal mode.

Although glass is adopted as the material of the glass substrate 23 and display device substrate 10 in the first exemplary embodiment, a flexible material may be used. In this case, since the transparent conductive film for position detection is formed on the opposing substrate as an integral part thereof, mechanical distortion due to bending does not readily occur and position detecting performance is not degraded by bending.

Further, although the switches 18a to 18c are provided for respective ones of the storage capacitance lines 8a to 8c in the first exemplary embodiment, the switches 18a to 18c of the storage capacitance lines 8a to 8c are not necessarily required. The reason for this is that there are cases where the voltage applied to the storage capacitance lines 8a to 8c and the voltage applied to the transparent conductive film 12 serving as the opposing electrode are the same. In this case, a signal identical with the AC signal applied to the opposing electrode is applied to the storage capacitance lines in the position detection interval and therefore is not seen as parasitic capacitance when seen from the opposing electrode. In this case, therefore, the switches 18a to 18c are unnecessary.

Further, although the switches 18a to 18c are provided for respective ones of the storage capacitance lines 8a to 8c in the first exemplary embodiment, these switches may be removed and a small number of switches may be provided at a node farther upstream on the side of the signal source of storage capacitance lines 8a to 8c, e.g., at the node marked by the "COM" symbols on the display device substrate 10 of FIG. 1.

Further, in the first exemplary embodiment, the transparent conductive film 12 is formed of ITO as the impedance surface and the resistor 40 is assumed to be the impedance of the equivalent circuit. However, by taking into consideration impedance that is inclusive of resistance, capacitance and inductance and solving the equivalent circuit in accordance with the frequency of the alternating current applied to the impedance surface, a computational equation for detecting the relationship between current values and coordinates of a touched position or whether or not the device has been touched may be derived and utilized.

Further, although the planarly formed resistor 40 is used as the impedance surface in the first exemplary embodiment, a planarly formed inductor or a planarly formed capacitor may be used as the impedance surface.

Figure 12:
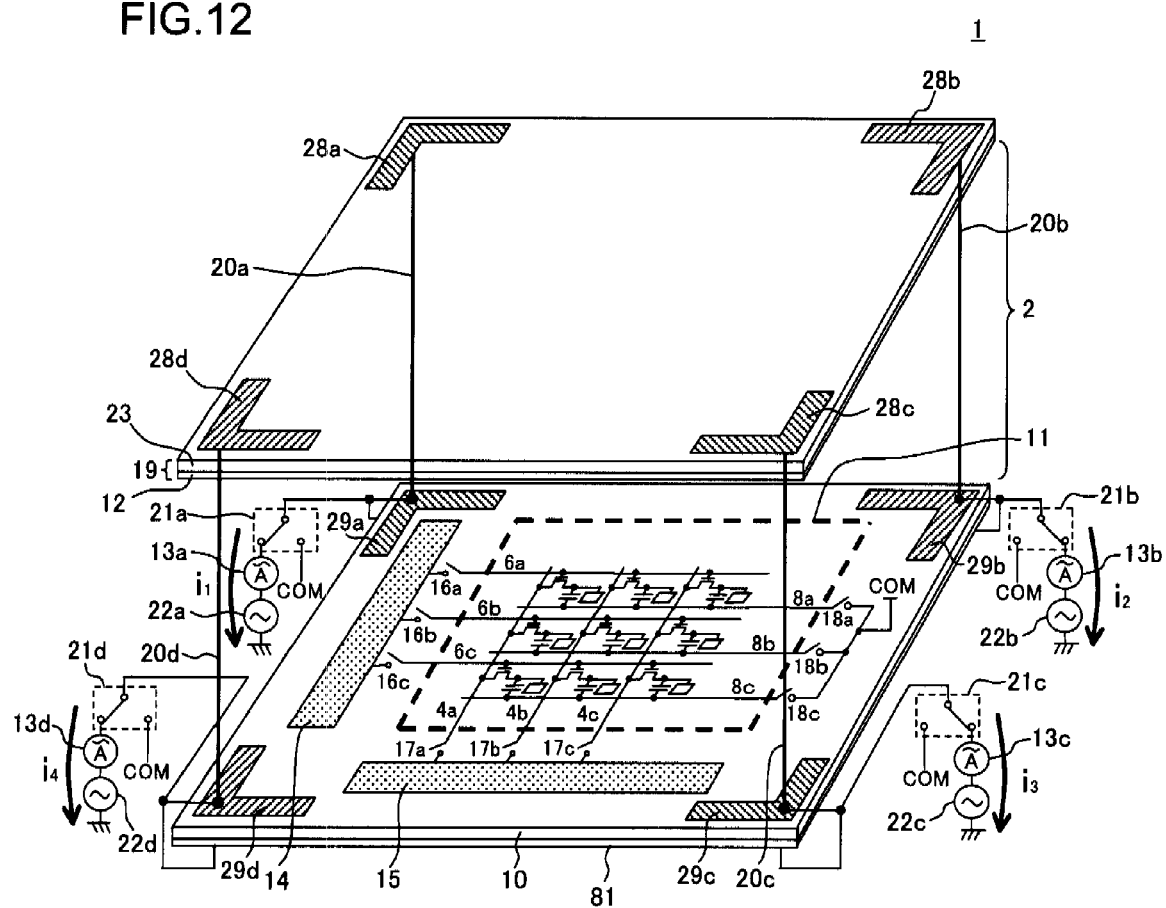
FIG. 12 is a perspective view schematically illustrating the structure of a second modification of the display device according to the first exemplary embodiment.
Figure 13:
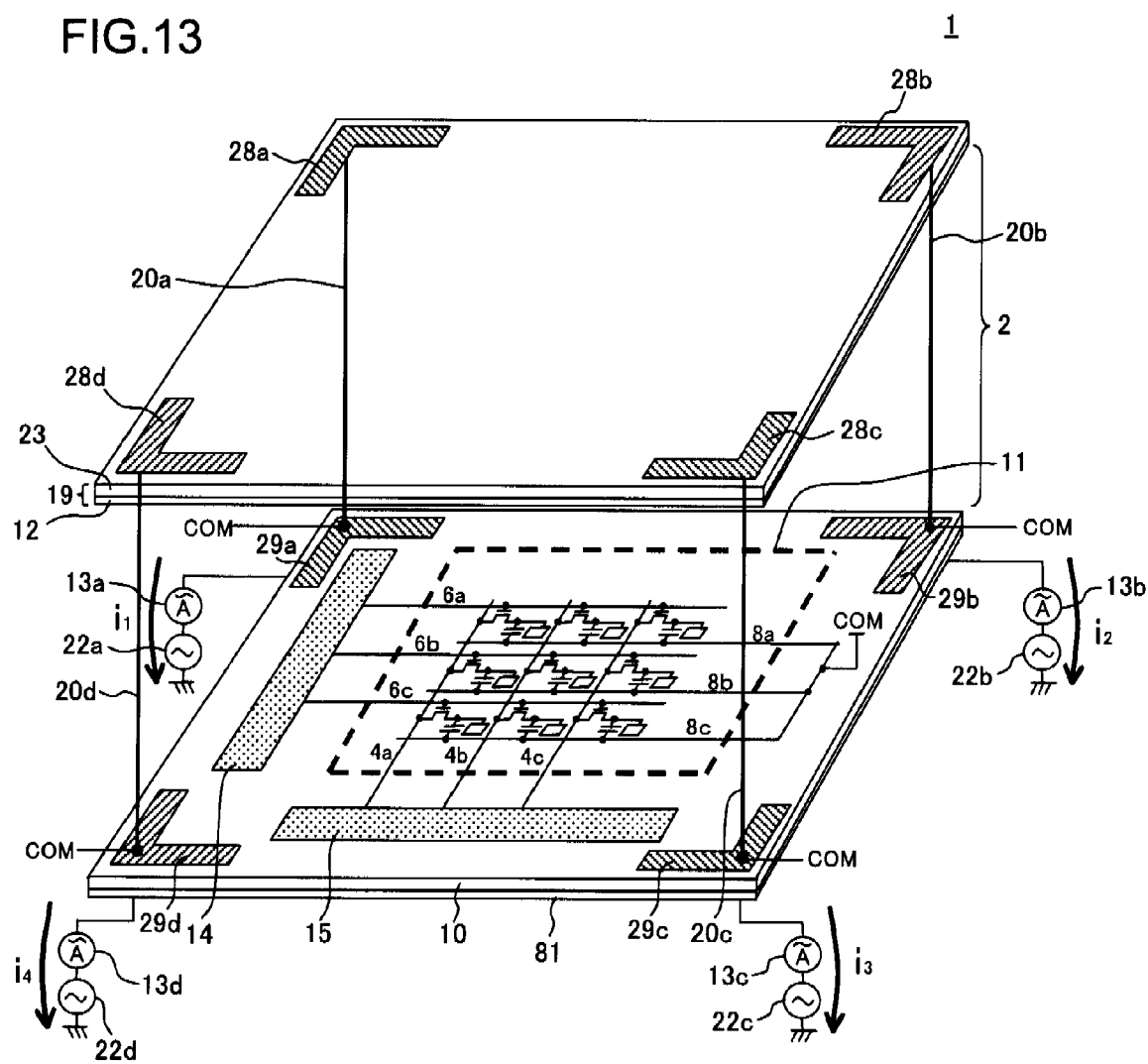
FIG. 13 is a perspective view schematically illustrating the structure of a third modification of the display device according to the first exemplary embodiment.
Figure 14:
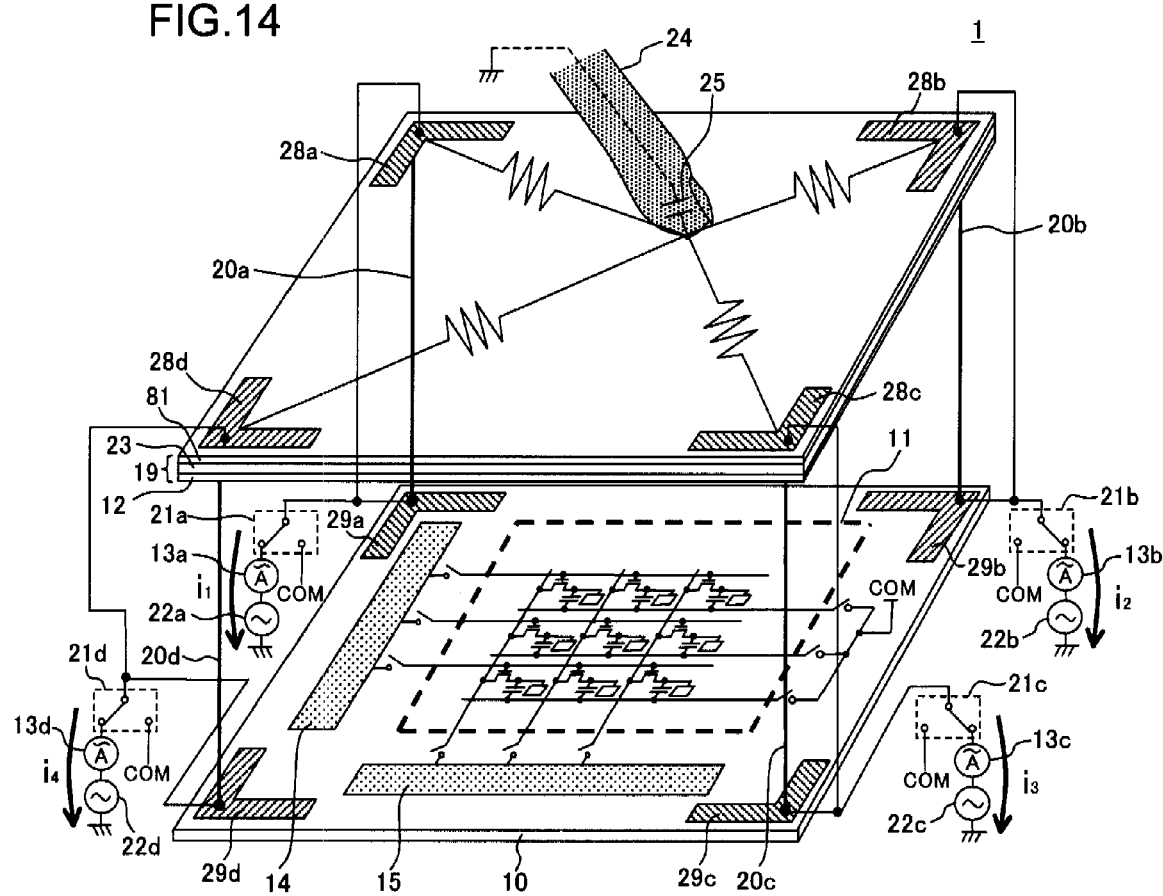
FIG. 14 is a perspective view schematically illustrating the structure of a fourth modification of the display device according to the first exemplary embodiment.
Figure 15:
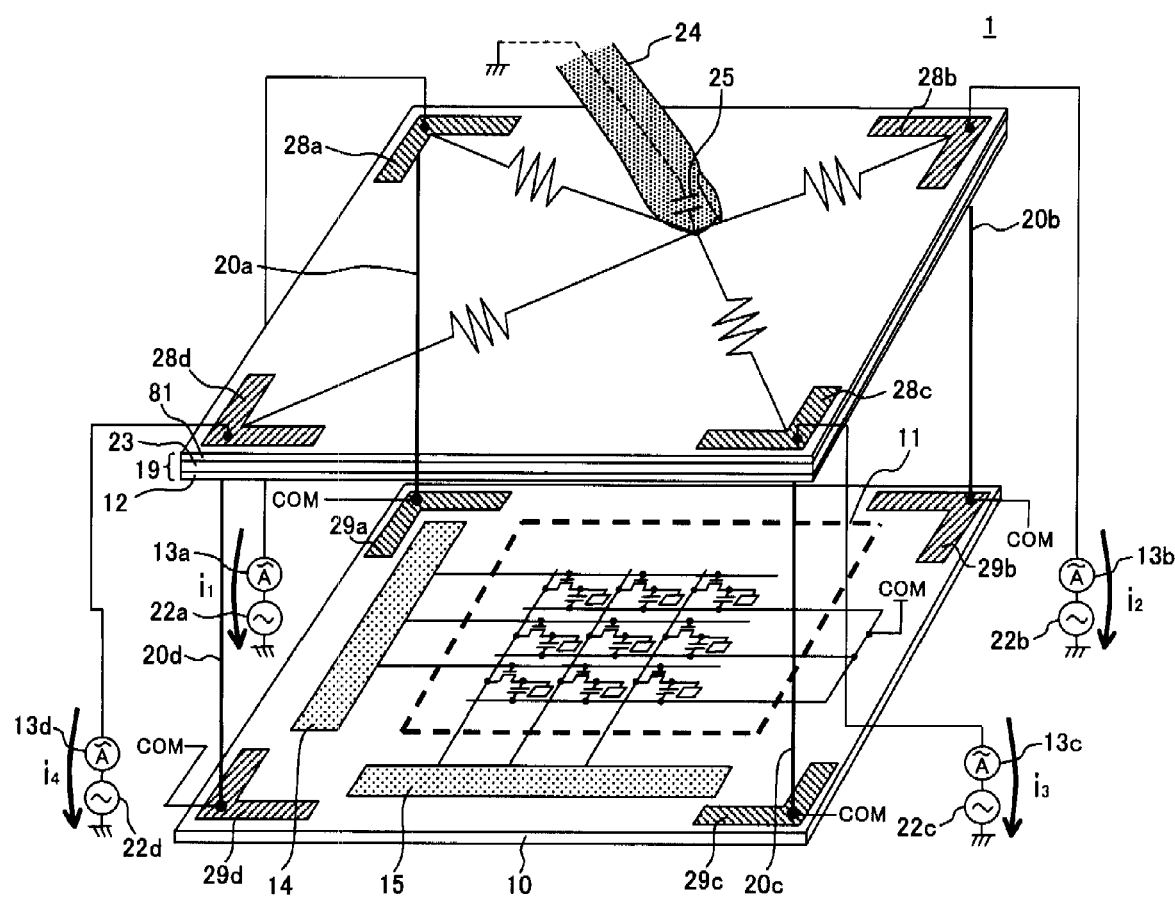
FIG. 15 is a perspective view schematically illustrating the structure of a fifth modification of the display device according to the first exemplary embodiment.
Figure 16:
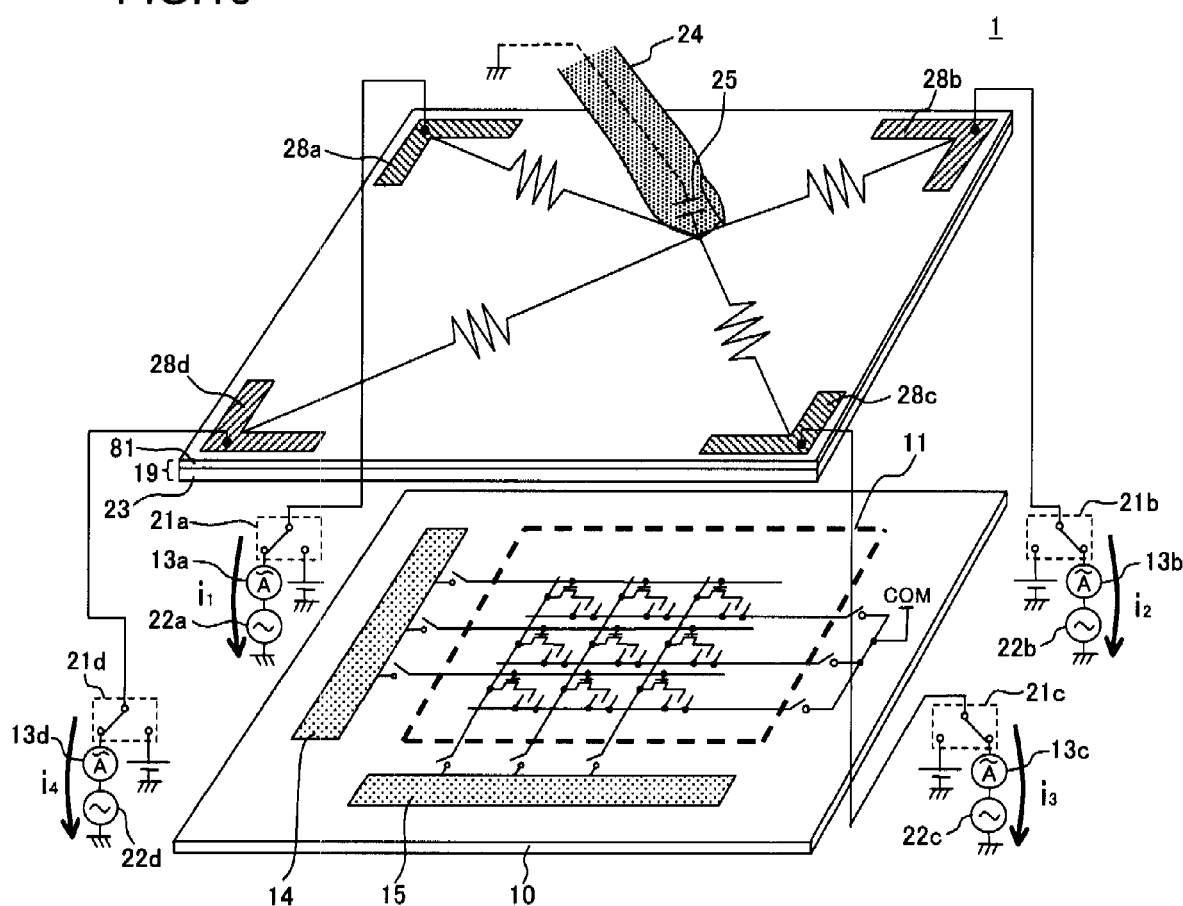
FIG. 16 is a perspective view schematically illustrating the structure of a sixth modification of the display device according to the first exemplary embodiment.
Figure 17:
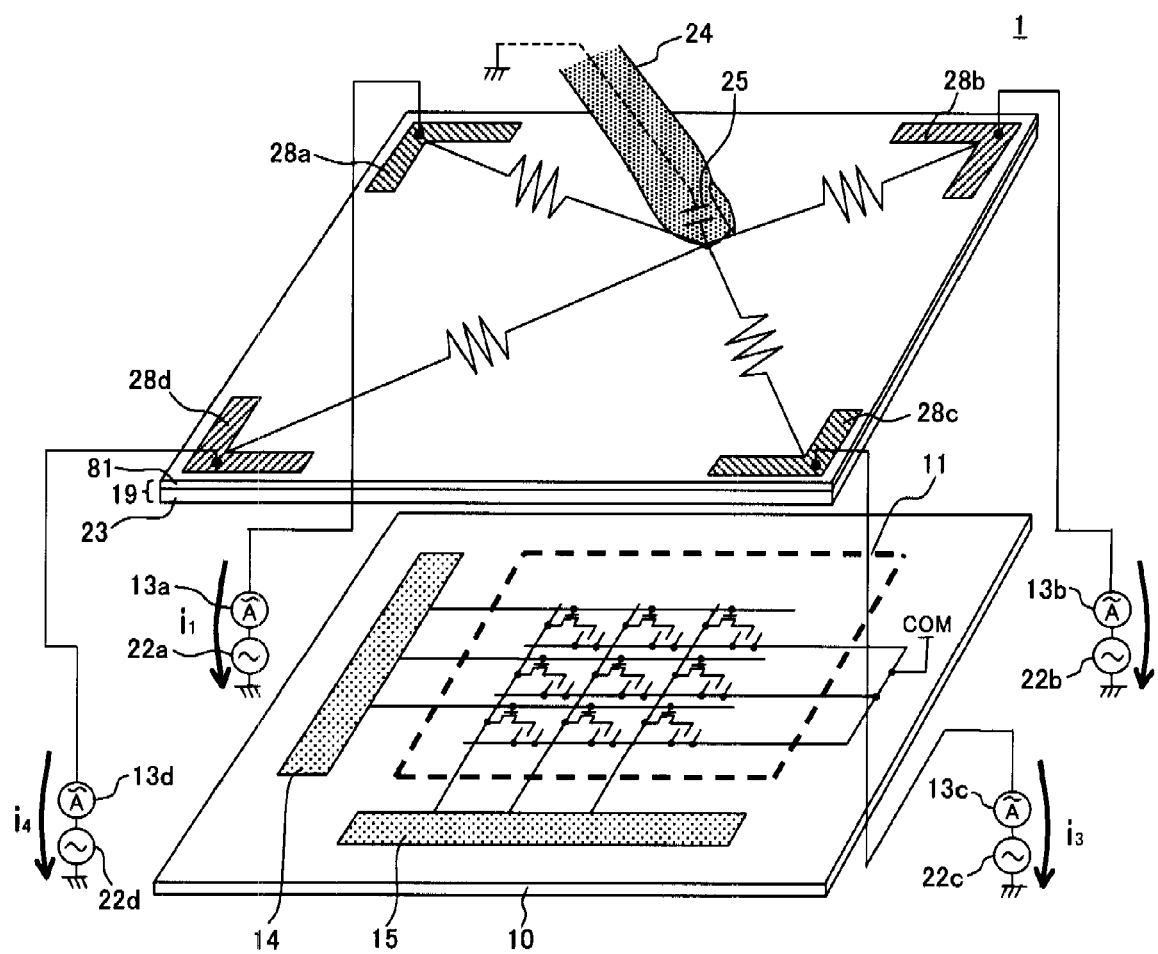
FIG. 17 is a perspective view schematically illustrating the structure of a seventh modification of the display device according to the first exemplary embodiment.

In the first exemplary embodiment, the arrangement is such that the liquid crystal 2 serving as the display element is placed between the display device substrate 10 and the opposing substrate 19 and the finger 24 on the side of the opposing substrate 19 is detected on the assumption that the person observing the display device is on the side of the opposing substrate 19. However, an arrangement that assumes the observer of the display device is present on the side of the display device substrate 10 may be adopted. Such an arrangement is shown in FIG. 12. In this case, in order to detect a finger (not shown) on the side of the display device substrate 10, a transparent conductive film 81 is formed on the surface of the display device substrate 10 on the side thereof facing the observer, and this film is utilized as a conductive film for detecting position. Even with this arrangement the parasitic capacitance of the position-detecting conductive film can be reduced markedly by placing the signal lines and scanning lines at the high impedance in the position detection interval just as described thus far. This effect is becoming particularly conspicuous with the thinning of the display device substrate 10 in recent years. Further, an arrangement in which means for placing the signal lines and scanning lines at a high impedance is removed may be adopted, as illustrated in FIG. 13. Further, an arrangement in which the transparent conductive film 81 is provided on the side of the opposing substrate 19 and finger 24 is detected on the side of the opposing substrate 19 may be adopted, as shown in FIG. 14. Further, an arrangement in which means for placing the signal lines and scanning lines at a high impedance is removed may be adopted, as illustrated in FIG. 15. In the examples described in FIGS. 12 to 15, the pixels are turned on and off by applying an electric field in the vertical direction of the liquid crystal 2, namely in a direction perpendicular to the plate surface of the display device substrate 10. However, in a case where use is made of a liquid crystal mode, such as the IPS-type liquid crystal mode mentioned above, in which the pixels are turned on and off by applying an electric field in the horizontal direction, namely the direction parallel to the display device substrate, it will suffice to adopt the arrangement depicted in FIG. 16. As illustrated in FIG. 16, a transparent conductive film is not formed on the surface of the opposing substrate 19 on the side thereof facing the display device substrate 10, and the position-detecting transparent conductive film 81 is formed on the surface of the opposing substrate 19 on the side thereof that is opposite display device substrate 10. Further, as illustrated in FIG. 17, an arrangement in which the means for placing the signal lines and scanning line at the high impedance is removed may be adopted. The transparent conductive film 81 is used in position detection and can prevent charging of the opposing substrate 19. This has the additional effect of eliminating a decline in image quality ascribable to charging.

[Second Exemplary Embodiment]

Figure 18:
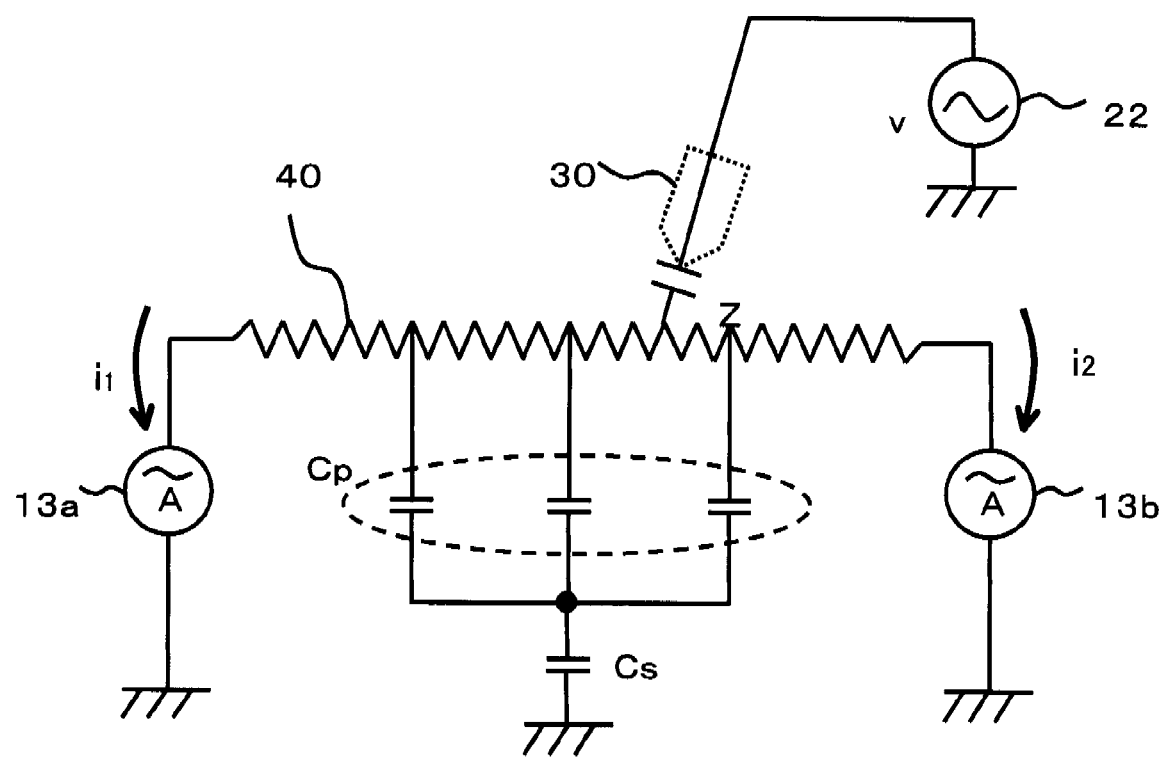
FIG. 18 is a circuit diagram useful in describing the position detection principle of a display device according to a second exemplary embodiment of the present invention.

A display device according to a second exemplary embodiment of the present invention will now be described with reference to the drawings. FIG. 18 is a circuit diagram useful in describing the position detection principle of a display device according to a second exemplary embodiment of the present invention.

In the first exemplary embodiment, AC voltage is applied directly to the resistor 40 (see FIG. 9). In the second exemplary embodiment, however, an indicating member (e.g., an electronic pen) 30 is connected to AC voltage source 22 and currents $i_1$, $i_2$ that flow via impedance Z are detected by current detecting circuits 13a, 13b, respectively. In this case also the interior and exterior of the display area (which corresponds to area 11 in FIG. 1) are placed at the high impedance in the position detection interval.

In accordance with the second exemplary embodiment, the parasitic capacitance of the resistor 40 is reduced markedly by placing the interior and exterior of the display area at the high impedance. As a result, current that flows in and out via the parasitic capacitance is greatly diminished, the currents $i_1$, $i_2$ that flow in and out of the current detecting circuits 13a, 13b are increased and the signal quantity is enlarged. This results in a much improved S/N ratio of the position detection signal and makes it possible to realize a combination touch sensor/display device.

[Third Exemplary Embodiment]

Figure 19:
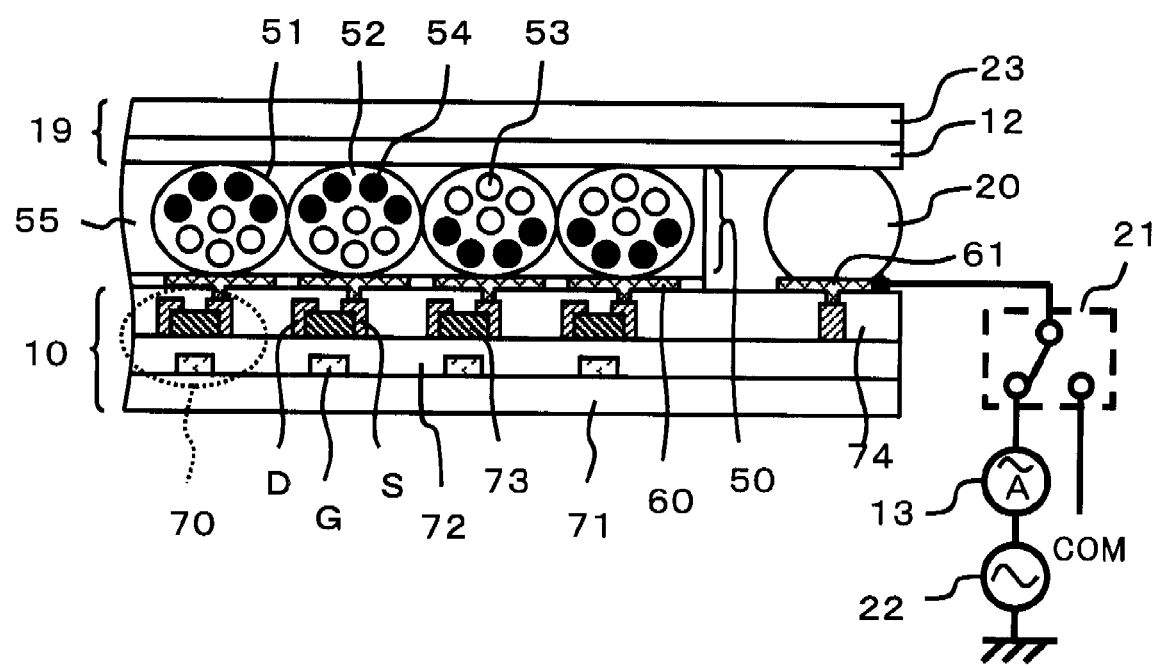
FIG. 19 is a partial sectional view schematically illustrating the structure of a display device according to a third exemplary embodiment of the present invention.

A display device according to a third exemplary embodiment of the present invention will now be described with reference to the drawings. FIG. 19 is a partial sectional view schematically illustrating the structure of a display device according to a third exemplary embodiment of the present invention.

The display device according to the third exemplary embodiment is an electrophoretic display device (EPD) that utilizes a microcapsule-type electrophoretic element. This is typically a monochromatic EPD active-matrix display. The display device has the opposing substrate 19, an EPD film 50 and the display device substrate 10.

The opposing substrate 19 includes a transparent plastic substrate 23 such as a polyethylene terephthalate, and an opposing electrode 12, which comprises a transparent conductive film, formed on the inner-side surface of the substrate 23. It should be noted that the opposing substrate 19 may employ a glass substrate instead of the plastic substrate 23.

The EPD film 50 is a film-like electrophoretic display device and comprises microcapsules 51 and a binder 55. The microcapsules 51, which are about 40 µm in size, for example, are spread within the EPD film 50. Sealed within each microcapsule 51 is a solvent 52 comprising, e.g., isopropyl alcohol (IPA), etc., and suspended in the solvent 52 in a dispersed state are white particles 53 of a titanium-oxide-based white pigment and black particles 54 of a carbon-based black pigment. Each of the particles is of nano-level size. The white particles 53 are charged to a minus (−) polarity and the black particles 54 are charged to a plus (+) polarity. The binder 55 comprises a polymer and fills the space between the microcapsules 51 to bind them together.

The display device substrate 10 is composed of a glass substrate 71 and thin-film transistors (TFTs) 70 formed on the glass substrate 71. The TFTs 70 are of reverse-stagger type with their gates G disposed on the side of the glass substrate 71 at a position closer thereto than their sources S and drains D. Each TFT 70 has its gate G formed on the glass substrate 71, has an insulating film 72 serving as a gate insulating film formed on the gate G, has a channel material 73 formed on the insulating film 72 above the gate G, and has its source S and drain D formed on the channel material 73 on both sides thereof. An insulating film 74 is formed on the insulating film 72 that includes the channel material 73, source S and drain D, a pixel electrode 60 is formed on the insulating film 74, and the pixel electrode 60 is connected to the source S through a via hole.

The gate G of each TFT 70 in FIG. 19 is electrically connected to a corresponding scanning line (not shown), and the drain D of each TFT 70 is electrically connected to a corresponding signal line (not shown). By applying voltage to the gate G, a +voltage that has been applied to the drain D is supplied to the corresponding pixel electrode 60 through the channel material 73 and source S. In the case where the +voltage is supplied to the pixel electrode 60, the white particles 53 in the corresponding microcapsule 51 are attracted toward the side of the pixel electrode 60, and the black particles 54 in the microcapsule 51 are attracted relatively toward the opposing electrode 12. On the other hand, in a case where a −voltage is supplied to the pixel electrode 60, the black particles 54 in the corresponding microcapsule 51 are attracted toward the side of the pixel electrode 60, and the white particles 53 in the microcapsule 51 are attracted relatively toward the opposing electrode 12. Thus, with the display device shown in FIG. 19, a black or white image display can be presented on the side of the opposing electrode 12 depending upon whether a +voltage or −voltage is applied to the pixel electrodes 60.

Provided at the corner of the display device between the opposing substrate 19 and the display device substrate 10 is conduction means 20 (e.g., silver paste) for electrically connecting an electrode 61 of the display device substrate 10 and the opposing electrode 12. A single-pole, double-throw switch 21 is connected to the electrode 61 of the display device substrate 10. Current detecting circuit 13 and AC voltage source 22 are serially connected to one contact of the switch 21, and the COM terminal to which the opposing electrode driving circuit is connected is connected to the other contact of the switch 21. It should be noted that although the switch 21 is connected to one end of the device in FIG. 19, in actuality such switches are connected to the four corners in the manner shown in FIG. 1.

In the third exemplary embodiment also the signal line driving circuit for driving the signal lines and the scanning line driving circuit for driving the scanning lines are provided external to the circuit area, switches are provided on the signal paths of the scanning lines to scanning line driving circuit and on the signal paths of the signal lines to signal line driving circuit, and it is so arranged that this wiring for transmitting electrical signals from the exterior to the interior of the display area is placed at a high impedance.

Further, in a manner similar to the first exemplary embodiment, the display device of the third exemplary embodiment has two intervals, namely a display drive interval relating to drive for writing a voltage for display purposes to the pixels, and a position detection interval in which current detecting circuits detect current in order to detect the position coordinates of a finger or whether a pointing operation has been performed. These two intervals are time-shared (time-divided).

In accordance with the third exemplary embodiment, the EPD has such a characteristic that after the voltage for display purposes is written, the display is maintained for a long period of time. In comparison with an LCD, therefore, a larger proportion of time can be allocated to the position detection interval. In addition, a display device can be realized in which the display device substrate 10 is thinned or the pixel circuit is transferred to a flexible substrate to impart flexibility, and in which a touch-sensor function is provided.

A liquid crystal display device and an electrophoretic display device have been described in the first to third exemplary embodiments. As a matter of course, however, the invention is also applicable to display devices that utilize other methods, such as those that utilize charged particles, an electrochromic material, an electroluminescent (EL) material, gas, semiconductor or phosphor or else.

As examples of utilization of the present invention, mention can be made of display devices that find use in game machines, PDAs, ticket machines, automatic teller machines (ATMs), car navigation, TVs and game machines mounted at the passenger seats of aircraft and buses, factory automatic (FA) equipment, printers and facsimile machines.

As many apparently widely different exemplary embodiments of the present invention can be made without departing from the spirit and scope thereof, it is to be understood that the invention is not limited to the specific exemplary embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A flat-panel display device comprising:
a display device substrate formed to have scanning and signal electrodes for applying electrical signals to an electro-optically responsive display element and pixel electrodes;
a display area formed by an array of the pixel electrodes;
an impedance surface corresponding to a display area of said flat-panel display device; and
a current detecting circuit that detects currents that flow through the impedance surface;
a detector that detects whether a touch occurs and coordinates of the touch based on the currents detected by said current detecting circuit;
wherein, while said current detecting circuit detects the currents, at least one of said scanning and signal electrodes for applying electrical signals, which extends from an exterior to an interior of the display area for transmitting an electrical signal from the exterior to the interior of the display area, from among the scanning and signal electrodes that apply the electrical signals to the display element, is placed directly at a high impedance against all voltage sources so as to enable to decrease the currents flowing through the impedance surface and low impedance scanning and signal electrodes other than the at least one of the scanning and signal electrodes placed at high impedance.

2. The device according to claim 1, further comprising a switch disposed on an electrode for transmitting an electrical signal from the exterior to the interior of the display area.

3. The device according to claim 2, comprising a control circuit for controlling switching of said switch;
wherein said control circuit controls at least one electrode for transmitting an electrical signal from the exterior to the interior of the display area to a high impedance while said current detecting circuit detects currents.

4. The device according to claim 1, wherein said display device substrate has a plurality of scanning lines and a plurality of signal lines formed on a substrate, switch elements formed in the vicinity of crosspoints of said scanning lines and signal lines and pixel electrodes connected to said switch elements;
wherein a display area is formed by an array of said pixel electrodes; and
wherein outputs of a first driving circuit for driving the scanning lines and outputs of a second driving circuit for driving the signal lines attain a high impedance while said current detecting circuit detects currents.

5. The device according to claim 4, wherein said display device substrate has capacitors one ends of which are connected to the switch elements and the pixel electrodes, and capacitor lines that are connected to the other ends of the capacitors and extend to the exterior of the display area; the capacitor lines being controlled to a high impedance against all voltage sources by controlling switching of the capacitor lines while said current detecting circuit detects currents.

6. The device according to claim 5, wherein the capacitor lines also serve as scanning lines.

7. The device according to claim 1, wherein the impedance surface is formed on an opposing substrate that opposes the display device substrate via the display element.

8. The device according to claim 1, wherein the display element is any one selected from the group consisting of liquid crystal, an electrophoretic element, a charged particle, electrochromic material, gas, semiconductor and phosphor.

9. The device according to claim 1, wherein the display element has liquid crystal as its main component, and the impedance surface comprises a transparent conductive film.

10. The device according to claim 1, wherein said current detecting circuit applies AC voltage upon the impedance surface and detects currents that flows through the impedance surface owing to application of the AC voltage.

11. The device according to claim 10, wherein a plurality of said current detecting circuits are provided in correspondence with a plurality of locations of the impedance surface, and each current detecting circuit applies an AC voltage from the corresponding location and detects currents at the corresponding location.

12. The device according to claim 1, further comprising:
an indicating member connected to an AC voltage source for supplying current to any position on the impedance surface;
a wiring connected to the indicating member; and
an AC voltage source connected to the wiring.

13. The device according to claim 1, further comprising a position detecting circuit that detects coordinates of point of contact of a contacting body with the impedance surface based upon an output signal from said current detecting circuit.

14. The device according to claim 2, wherein a flexible material is used for material forming the display device substrate and opposing substrate.

15. The device according to claim 1, wherein a linearization pattern is formed on the impedance surface.

16. An electronic apparatus on which the flat-panel display device set forth in claim 1 has been mounted.

17. A flat-panel display device comprising:
an electro-optically responsive display element;
a display device substrate on which scanning and signal electrodes for applying electrical signals to said display element and pixel electrodes are formed;
a display area formed by an array of the pixel electrodes; and
an opposing substrate disposed at a position opposing said display device substrate via said display element;
wherein a surface of said display device substrate on a side thereof opposite said opposing substrate has an impedance surface,
wherein said flat-panel display device further comprises a current detecting circuit that detects currents that flow through the impedance surface, and
wherein, while said current detecting circuit detects the currents, at least one of said scanning and signal electrodes for applying electrical signals, which extends from an exterior to an interior of the display area for transmitting an electrical signal from the exterior to the interior of the display area, from among the scanning and signal electrodes that apply the electrical signals to the display element, is placed directly at a high impedance against all voltage sources so as to enable to decrease the currents flowing through the impedance surface and-low impedance scanning and signal electrodes other than the at least one of the scanning and signal electrodes placed at high impedance.

18. An electronic apparatus on which the flat-panel display device set forth in claim 17 has been mounted.

19. A flat-panel display device comprising:
an electro-optically responsive display element;
a display device substrate on which scanning and signal electrodes for applying electrical signals to said display element and pixel electrodes are formed;
a display area formed by an array of the pixel electrodes; and
an opposing substrate disposed at a position opposing said display device substrate via said display element;
wherein a surface of said opposing substrate on a side thereof opposite said display device substrate has an impedance surface,
wherein said flat-panel display device further comprises a current detecting circuit that detects currents that flow through the impedance surface, and
wherein while said current detecting circuit detects the currents, at least one of said scanning and signal electrodes for applying electrical signals, which extends from an exterior to an interior of the display area for transmitting an electrical signal from the exterior to the interior of the display area, from among the scanning and signal electrodes that apply the electrical signals to the display element, is placed directly at a high impedance against all voltage sources so as to enable to decrease the currents flowing through the impedance surface and-low impedance scanning and signal electrodes other than the at least one of the scanning and signal electrodes placed at high impedance.

20. An electronic apparatus on which the flat-panel display device set forth in claim 19 is mounted.

21. A flat-panel display device comprising:
a display device substrate having a plurality of scanning lines, a plurality of signal lines, pixel electrodes formed in the vicinity of crosspoints of said scanning lines and said signal lines, and switch elements comprising a TFT and switching electric connection with said pixel electrodes and said signal lines;
a first voltage source supplied to an output of the scanning lines;
a second voltage source supplied to an output of the signal lines;
a display area formed of an array of said pixel electrodes;
an impedance surface corresponding to said display area;
a display element being carried and sandwiched between said display device substrate to said impedance surface, and responding electro-optically; and
a current detecting circuit detecting currents that flow through said impedance surface;
wherein, while said current detecting circuit detects the currents, at least one of said scanning lines and said signal lines is placed directly at a high impedance against all voltage sources so as to enable to decrease the currents flowing through the impedance surface and-low impedance scanning lines and signal lines other than the at least one of said scanning lines and said signal lines placed at high impedance.

22. A flat panel display device comprising:
a display device substrate formed to have scanning and signal electrodes for applying electrical signals to an electro-optically responsive display element;
an impedance surface corresponding to a display area of said flat-panel display device;
a current detecting circuit that detects currents that flow through the impedance surface and supplies its output to a position detecting circuit that detects whether a touch occurs and coordinates of the touch;
wherein, while said current detecting circuit detects the currents, at least one of said scanning and signal electrodes-for applying electrical signals for transmitting an electrical signal from an exterior to an interior of the display area, from among the scanning and signal electrodes for applying the electrical signals to the display element, is placed directly at a high impedance against all voltage sources so as to enable to decrease the currents flowing through the impedance surface and low impedance scanning and signal electrodes other than the at least one of the scanning and signal electrodes placed at high impedance,
wherein said display device substrate has a plurality of scanning lines and a plurality of signal lines formed on a substrate, switch elements comprising a TFT and formed in the vicinity of crosspoints of said scanning lines and signal lines and pixel electrodes connected to said switch elements,
wherein the display area is formed by an array of said pixel electrodes, wherein outputs of a first driving circuit for driving the scanning lines and outputs of a second driving circuit for driving the signal lines attain a high impedance while said current detecting circuit detects current, and wherein the impedance surface is opposite to the scanning line and the signal line.

* * * * *